United States Patent
Artes et al.

(10) Patent No.: US 11,768,494 B2
(45) Date of Patent: Sep. 26, 2023

(54) SUBDIVISION OF MAPS FOR ROBOT NAVIGATION

(71) Applicant: RobArt GmbH, Linz (AT)

(72) Inventors: Harold Artes, Linz (AT); Michael Schahpar, Linz (AT); Dominik Seethaler, Linz (AT); Reinhard Vogel, Linz (AT)

(73) Assignee: RobArt GmbH, Linz (AT)

( * ) Notice: Subject to any disclaimer, the term of this patent is extended or adjusted under 35 U.S.C. 154(b) by 0 days.

(21) Appl. No.: 15/775,333

(22) PCT Filed: Nov. 11, 2016

(86) PCT No.: PCT/AT2016/060108
§ 371 (c)(1),
(2) Date: May 10, 2018

(87) PCT Pub. No.: WO2017/079777
PCT Pub. Date: May 18, 2017

(65) Prior Publication Data
US 2019/0025838 A1    Jan. 24, 2019

(30) Foreign Application Priority Data

Nov. 11, 2015    (DE) ...................... 10 2015 119 501.1

(51) Int. Cl.
*G05D 1/02* (2020.01)
*G05D 1/00* (2006.01)

(52) U.S. Cl.
CPC ......... *G05D 1/0214* (2013.01); *G05D 1/0044* (2013.01); *G05D 1/0219* (2013.01);
(Continued)

(58) Field of Classification Search
CPC .. G05D 1/0214; G05D 1/0219; G05D 1/0246; G05D 1/0274; G05D 2201/0215; G05D 1/0044; G05D 2201/0203
See application file for complete search history.

(56) References Cited

U.S. PATENT DOCUMENTS

| 4,674,048 A | 6/1987 | Okumura |
| 4,740,676 A | 4/1988 | Satoh et al. |

(Continued)

FOREIGN PATENT DOCUMENTS

| AU | 2015322263 | 4/2017 |
| CA | 2322419 | 9/1999 |

(Continued)

OTHER PUBLICATIONS

English translation for reference EP2407847A2 (Year: 2012).*

(Continued)

*Primary Examiner* — Rachid Bendidi
(74) *Attorney, Agent, or Firm* — Akerman LLP; Peter A. Chiabotti

(57) ABSTRACT

An optical triangulation sensor for distance measurement is described herein. In accordance with one embodiment, the apparatus comprises a light source for the generation of structured light, an optical reception device, at least one attachment element and a carrier with a first groove on a lateral surface of the carrier, wherein the light source and/or optical reception device is at least partially arranged in the first groove and is held in place on the carrier by the attachment element.

22 Claims, 7 Drawing Sheets

(52) U.S. Cl.
CPC ......... *G05D 1/0246* (2013.01); *G05D 1/0274* (2013.01); *G05D 2201/0203* (2013.01); *G05D 2201/0215* (2013.01)

(56) References Cited

U.S. PATENT DOCUMENTS

| | | | |
|---|---|---|---|
| 4,777,416 A | 10/1988 | George, II et al. | |
| 5,109,566 A | 5/1992 | Kobayashi et al. | |
| 5,260,710 A | 11/1993 | Omamyuda et al. | |
| 5,284,522 A | 2/1994 | Kobayashi et al. | |
| 5,377,106 A | 12/1994 | Drunk et al. | |
| 5,402,051 A | 3/1995 | Fujiwara et al. | |
| 5,696,675 A | 12/1997 | Nakamura et al. | |
| 5,787,545 A | 8/1998 | Colens | |
| 5,995,884 A | 11/1999 | Allen et al. | |
| 6,366,219 B1 | 4/2002 | Hoummady | |
| 6,389,329 B1 | 5/2002 | Colens | |
| 6,532,404 B2 | 3/2003 | Colens | |
| 6,594,844 B2 | 7/2003 | Jones | |
| 6,605,156 B1 | 8/2003 | Clark et al. | |
| 6,615,108 B1 | 9/2003 | Peless et al. | |
| 6,667,592 B2 | 12/2003 | Jacobs et al. | |
| 6,690,134 B1 | 2/2004 | Jones et al. | |
| 6,764,373 B1 | 7/2004 | Osawa et al. | |
| 6,781,338 B2 | 8/2004 | Jones et al. | |
| 6,809,490 B2 | 10/2004 | Jones et al. | |
| 6,965,209 B2 | 11/2005 | Jones et al. | |
| 6,972,834 B1 | 12/2005 | Oka et al. | |
| 7,155,308 B2 | 12/2006 | Jones | |
| 7,173,391 B2 | 2/2007 | Jones et al. | |
| 7,196,487 B2 | 3/2007 | Jones et al. | |
| 7,302,345 B2 | 11/2007 | Kwon et al. | |
| 7,388,343 B2 | 6/2008 | Jones et al. | |
| 7,389,156 B2 | 6/2008 | Ziegler et al. | |
| 7,448,113 B2 | 11/2008 | Jones et al. | |
| 7,483,151 B2 | 1/2009 | Zganec et al. | |
| 7,507,948 B2 | 3/2009 | Park et al. | |
| 7,539,557 B2 | 5/2009 | Yamauchi | |
| 7,571,511 B2 | 8/2009 | Jones et al. | |
| 7,636,982 B2 | 12/2009 | Jones et al. | |
| 7,656,541 B2 | 2/2010 | Waslowski et al. | |
| 7,761,954 B2 | 7/2010 | Ziegler et al. | |
| 7,801,676 B2 | 9/2010 | Kurosawa et al. | |
| 8,438,695 B2 | 5/2013 | Gilbert et al. | |
| 8,594,019 B2 | 11/2013 | Misumi | |
| 8,739,355 B2 | 6/2014 | Morse et al. | |
| 8,855,914 B1 | 10/2014 | Alexander et al. | |
| 8,892,251 B1 | 11/2014 | Dooley et al. | |
| 8,921,752 B2 | 12/2014 | Iizuka | |
| 8,982,217 B1 | 3/2015 | Hickman | |
| 9,002,511 B1 | 4/2015 | Hickerson et al. | |
| 9,026,302 B2 | 5/2015 | Stout et al. | |
| 9,037,294 B2 | 5/2015 | Chung et al. | |
| 9,043,017 B2 | 5/2015 | Jung et al. | |
| 9,149,170 B2 | 10/2015 | Ozick et al. | |
| 9,220,386 B2 | 12/2015 | Gilbert, Jr. et al. | |
| 9,298,183 B2 | 3/2016 | Artés et al. | |
| 9,486,924 B2 | 11/2016 | Dubrovsky et al. | |
| 9,717,387 B1 | 8/2017 | Szatmary et al. | |
| 10,228,697 B2 | 3/2019 | Yoshino | |
| 10,661,433 B2 | 5/2020 | Angle | |
| 2002/0016649 A1 | 2/2002 | Jones | |
| 2002/0103575 A1 | 8/2002 | Sugawara | |
| 2002/0120364 A1 | 8/2002 | Colens | |
| 2003/0025472 A1 | 2/2003 | Jones et al. | |
| 2003/0030398 A1 | 2/2003 | Jacobs et al. | |
| 2003/0034441 A1 | 2/2003 | Kang et al. | |
| 2003/0142925 A1 | 7/2003 | Melchior et al. | |
| 2004/0020000 A1 | 2/2004 | Jones | |
| 2004/0049877 A1 | 3/2004 | Jones et al. | |
| 2004/0187457 A1 | 9/2004 | Colens | |
| 2004/0207355 A1 | 10/2004 | Jones et al. | |
| 2005/0000543 A1 | 1/2005 | Taylor et al. | |
| 2005/0010331 A1 | 1/2005 | Taylor et al. | |
| 2005/0041839 A1 | 2/2005 | Saitou et al. | |
| 2005/0067994 A1 | 3/2005 | Jones et al. | |
| 2005/0156562 A1 | 7/2005 | Cohen et al. | |
| 2005/0171636 A1 | 8/2005 | Tani | |
| 2005/0171644 A1 | 8/2005 | Tani | |
| 2005/0204717 A1 | 9/2005 | Colens | |
| 2005/0212680 A1 | 9/2005 | Uehigashi | |
| 2005/0256610 A1 | 11/2005 | Orita | |
| 2006/0012493 A1 | 1/2006 | Karlsson et al. | |
| 2006/0020369 A1 | 1/2006 | Taylor | |
| 2006/0095158 A1 | 5/2006 | Lee et al. | |
| 2006/0237634 A1 | 10/2006 | Kim | |
| 2007/0027579 A1* | 2/2007 | Suzuki | G05D 1/0251 700/245 |
| 2007/0061041 A1 | 3/2007 | Zweig | |
| 2007/0234492 A1 | 10/2007 | Svendsen et al. | |
| 2007/0266508 A1 | 11/2007 | Jones et al. | |
| 2007/0282484 A1* | 12/2007 | Chung | B25J 19/023 700/245 |
| 2008/0046125 A1 | 2/2008 | Myeong et al. | |
| 2008/0140255 A1 | 6/2008 | Ziegler et al. | |
| 2008/0155768 A1 | 7/2008 | Ziegler et al. | |
| 2008/0192256 A1 | 8/2008 | Wolf et al. | |
| 2008/0307590 A1 | 12/2008 | Jones et al. | |
| 2009/0048727 A1 | 2/2009 | Hong et al. | |
| 2009/0051921 A1 | 2/2009 | Masahiko | |
| 2009/0143912 A1* | 6/2009 | Wang | B25J 9/1671 700/259 |
| 2009/0177320 A1 | 7/2009 | Lee et al. | |
| 2009/0182464 A1 | 7/2009 | Myeong et al. | |
| 2009/0281661 A1 | 11/2009 | Dooley et al. | |
| 2010/0030380 A1 | 2/2010 | Shah et al. | |
| 2010/0049365 A1 | 2/2010 | Jones et al. | |
| 2010/0082193 A1 | 4/2010 | Chiappetta | |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2010/0324731 A1 | 12/2010 | Letsky | |
| 2010/0324736 A1 | 12/2010 | Yoo et al. | |
| 2011/0054689 A1 | 3/2011 | Nielsen et al. | |
| 2011/0137461 A1* | 6/2011 | Kong | G05D 1/0225 700/253 |
| 2011/0194755 A1 | 8/2011 | Jeong et al. | |
| 2011/0211731 A1 | 9/2011 | Lee et al. | |
| 2011/0224824 A1 | 9/2011 | Lee et al. | |
| 2011/0231018 A1* | 9/2011 | Iwai | B25J 9/1694 700/253 |
| 2011/0236026 A1 | 9/2011 | Yoo et al. | |
| 2011/0238214 A1 | 9/2011 | Yoo et al. | |
| 2011/0264305 A1 | 10/2011 | Choe et al. | |
| 2011/0278082 A1 | 11/2011 | Chung et al. | |
| 2011/0295420 A1 | 12/2011 | Wagner | |
| 2012/0008128 A1 | 1/2012 | Bamji | |
| 2012/0013907 A1 | 1/2012 | Jung et al. | |
| 2012/0022785 A1 | 1/2012 | DiBernardo et al. | |
| 2012/0060320 A1 | 3/2012 | Lee et al. | |
| 2012/0069457 A1 | 3/2012 | Wolf et al. | |
| 2012/0169497 A1 | 7/2012 | Schmittman et al. | |
| 2012/0173070 A1 | 7/2012 | Schmittman | |
| 2012/0215380 A1 | 8/2012 | Fouillade et al. | |
| 2012/0223216 A1 | 9/2012 | Flaherty et al. | |
| 2012/0265370 A1 | 10/2012 | Kim et al. | |
| 2012/0271502 A1 | 10/2012 | Lee | |
| 2012/0283905 A1 | 11/2012 | Nakano et al. | |
| 2013/0001398 A1 | 1/2013 | Wada et al. | |
| 2013/0024025 A1 | 1/2013 | Hsu | |
| 2013/0166134 A1* | 6/2013 | Shitamoto | G05D 1/024 701/26 |
| 2013/0206177 A1 | 8/2013 | Burlutskiy | |
| 2013/0217421 A1 | 8/2013 | Kim | |
| 2013/0221908 A1 | 8/2013 | Tang | |
| 2013/0261867 A1 | 10/2013 | Burnett et al. | |
| 2013/0265562 A1 | 10/2013 | Tang et al. | |
| 2013/0317944 A1 | 11/2013 | Huang et al. | |
| 2014/0005933 A1 | 1/2014 | Fong et al. | |
| 2014/0098218 A1 | 4/2014 | Wu et al. | |
| 2014/0100693 A1 | 4/2014 | Fong et al. | |
| 2014/0115797 A1 | 5/2014 | Duenne | |
| 2014/0124004 A1 | 5/2014 | Rosenstein et al. | |

(56) References Cited

U.S. PATENT DOCUMENTS

| | | | |
|---|---|---|---|
| 2014/0128093 A1* | 5/2014 | Das | H04W 64/006 |
| | | | 455/456.1 |
| 2014/0156125 A1 | 6/2014 | Song et al. | |
| 2014/0207280 A1 | 7/2014 | Duffley et al. | |
| 2014/0207281 A1 | 7/2014 | Angle et al. | |
| 2014/0207282 A1 | 7/2014 | Angle et al. | |
| 2014/0218517 A1 | 8/2014 | Kim et al. | |
| 2014/0257563 A1 | 9/2014 | Park et al. | |
| 2014/0257564 A1 | 9/2014 | Sun et al. | |
| 2014/0257565 A1 | 9/2014 | Sun et al. | |
| 2014/0303775 A1 | 10/2014 | Oh et al. | |
| 2014/0316636 A1 | 10/2014 | Hong et al. | |
| 2014/0324270 A1 | 10/2014 | Chan et al. | |
| 2014/0343783 A1 | 11/2014 | Lee | |
| 2015/0006289 A1* | 1/2015 | Jakobson | G06Q 30/0256 |
| | | | 705/14.54 |
| 2015/0115138 A1 | 4/2015 | Heng et al. | |
| 2015/0115876 A1 | 4/2015 | Noh et al. | |
| 2015/0120056 A1 | 4/2015 | Noh et al. | |
| 2015/0151646 A1 | 6/2015 | Noiri | |
| 2015/0166060 A1 | 6/2015 | Smith | |
| 2015/0168954 A1 | 6/2015 | Hickerson et al. | |
| 2015/0173578 A1 | 6/2015 | Kim et al. | |
| 2015/0202772 A1 | 7/2015 | Kim | |
| 2015/0212520 A1 | 7/2015 | Artes et al. | |
| 2015/0223659 A1 | 8/2015 | Han et al. | |
| 2015/0260829 A1 | 9/2015 | Wada | |
| 2015/0265125 A1 | 9/2015 | Lee et al. | |
| 2015/0269823 A1 | 9/2015 | Yamanishi et al. | |
| 2015/0314453 A1 | 11/2015 | Witelson et al. | |
| 2015/0367513 A1 | 12/2015 | Gettings et al. | |
| 2016/0008982 A1 | 1/2016 | Artes et al. | |
| 2016/0026185 A1 | 1/2016 | Artes et al. | |
| 2016/0037983 A1 | 2/2016 | Hillen et al. | |
| 2016/0041029 A1 | 2/2016 | T'ng et al. | |
| 2016/0066759 A1 | 3/2016 | Miele et al. | |
| 2016/0103451 A1 | 4/2016 | Vicenti | |
| 2016/0123618 A1 | 5/2016 | Hester et al. | |
| 2016/0132056 A1 | 5/2016 | Yoshino | |
| 2016/0150933 A1 | 6/2016 | Duenne et al. | |
| 2016/0165795 A1 | 6/2016 | Balutis et al. | |
| 2016/0166126 A1 | 6/2016 | Morin et al. | |
| 2016/0200161 A1 | 7/2016 | Van Den Bossche et al. | |
| 2016/0209217 A1 | 7/2016 | Babu et al. | |
| 2016/0213218 A1 | 7/2016 | Ham et al. | |
| 2016/0214258 A1 | 7/2016 | Yan | |
| 2016/0229060 A1 | 8/2016 | Kim et al. | |
| 2016/0271795 A1 | 9/2016 | Vicenti | |
| 2016/0282873 A1 | 9/2016 | Masaki et al. | |
| 2016/0297072 A1 | 10/2016 | Williams et al. | |
| 2016/0298970 A1 | 10/2016 | Lindhe et al. | |
| 2017/0001311 A1 | 1/2017 | Bushman et al. | |
| 2017/0083022 A1 | 3/2017 | Tang | |
| 2017/0147000 A1 | 5/2017 | Hoennige et al. | |
| 2017/0164800 A1 | 6/2017 | Arakawa | |
| 2017/0177001 A1 | 6/2017 | Cao et al. | |
| 2017/0197314 A1 | 7/2017 | Stout et al. | |
| 2017/0231452 A1 | 8/2017 | Saito et al. | |
| 2017/0273528 A1 | 9/2017 | Watanabe | |
| 2017/0364087 A1 | 12/2017 | Tang et al. | |
| 2018/0004217 A1 | 1/2018 | Biber et al. | |
| 2018/0074508 A1 | 3/2018 | Kleiner et al. | |
| 2020/0348666 A1 | 11/2020 | Han | |

FOREIGN PATENT DOCUMENTS

| | | | |
|---|---|---|---|
| CN | 1381340 | 11/2002 | |
| CN | 1696612 | 11/2005 | |
| CN | 101920498 | 12/2010 | |
| CN | 101945325 | 1/2011 | |
| CN | 101972129 | 2/2011 | |
| CN | 102407522 | 4/2012 | |
| CN | 102738862 | 10/2012 | |
| CN | 102866706 | 1/2013 | |
| CN | 103885444 | 6/2014 | |
| CN | 203672362 | 6/2014 | |
| CN | 104115082 | 10/2014 | |
| CN | 104460663 | 3/2015 | |
| CN | 104634601 | 5/2015 | |
| CN | 104765362 | 7/2015 | |
| CN | 105045098 | 11/2015 | |
| CN | 105334847 | 2/2016 | |
| CN | 105467398 | 4/2016 | |
| CN | 105527619 | 4/2016 | |
| CN | 105593775 | 5/2016 | |
| CN | 105990876 | 10/2016 | |
| DE | 4421805 | 8/1995 | |
| DE | 10204223 | 8/2003 | |
| DE | 10261787 | 1/2004 | |
| DE | 60002209 | 3/2004 | |
| DE | 69913150 | 8/2004 | |
| DE | 102007016802 | 5/2008 | |
| DE | 102008028931 | 6/2008 | |
| DE | 102008014912 | 9/2009 | |
| DE | 102009059217 | 2/2011 | |
| DE | 102009041362 | 3/2011 | |
| DE | 102009052629 | 5/2011 | |
| DE | 102010000174 | 7/2011 | |
| DE | 102010000317 | 8/2011 | |
| DE | 102010000607 | 9/2011 | |
| DE | 102010017211 | 12/2011 | |
| DE | 102010017689 | 1/2012 | |
| DE | 102010033768 | 2/2012 | |
| DE | 102011050357 | 2/2012 | |
| DE | 102012201870 | 8/2012 | |
| DE | 102011006062 | 9/2012 | |
| DE | 102011051729 | 1/2013 | |
| DE | 102012211071 | 11/2013 | |
| DE | 102012105608 | 1/2014 | |
| DE | 102012109004 | 3/2014 | |
| DE | 202014100346 | 3/2014 | |
| DE | 102012112035 | 6/2014 | |
| DE | 102012112036 | 6/2014 | |
| DE | 102013100192 | 7/2014 | |
| DE | 102014110265 | 7/2014 | |
| DE | 102014113040 | 9/2014 | |
| DE | 102013104399 | 10/2014 | |
| DE | 102013104547 | 11/2014 | |
| DE | 102015006014 | 5/2015 | |
| DE | 102014012811 | 10/2015 | |
| DE | 102015119501 | 11/2015 | |
| DE | 102014110104 | 1/2016 | |
| DE | 102016102644 | 2/2016 | |
| DE | 102016114594 | 2/2018 | |
| DE | 102016125319 | 6/2018 | |
| EP | 142594 | 5/1985 | |
| EP | 0402764 | 12/1990 | |
| EP | 0769923 | 5/1997 | |
| EP | 1062524 | 12/2000 | |
| EP | 1342984 | 9/2003 | |
| EP | 1533629 | 5/2005 | |
| EP | 1553536 | 7/2005 | |
| EP | 1557730 | 7/2005 | |
| EP | 1621948 | 2/2006 | |
| EP | 1942313 | 7/2008 | |
| EP | 1947477 | 7/2008 | |
| EP | 1983396 | 10/2008 | |
| EP | 2027806 | 2/2009 | |
| EP | 2053417 | 4/2009 | |
| EP | 2078996 | 7/2009 | |
| EP | 2287697 | 2/2011 | |
| EP | 2327957 | 6/2011 | |
| EP | 1941411 | 9/2011 | |
| EP | 2407847 | 1/2012 | |
| EP | 2407847 A2 * | 1/2012 | ........... G05D 1/0274 |
| EP | 2450762 | 5/2012 | |
| EP | 2457486 | 5/2012 | |
| EP | 2498158 | 9/2012 | |
| EP | 2502539 | 9/2012 | |
| EP | 2511782 | 10/2012 | |
| EP | 2515196 | 10/2012 | |
| EP | 2571660 | 3/2013 | |
| EP | 2573639 | 3/2013 | |

(56) References Cited

FOREIGN PATENT DOCUMENTS

| | | |
|---|---|---|
| EP | 2595024 | 5/2013 |
| EP | 2740013 | 6/2014 |
| EP | 2741159 | 6/2014 |
| EP | 2853976 | 4/2015 |
| EP | 2752726 | 5/2015 |
| EP | 2870852 | 5/2015 |
| EP | 3079030 | 11/2015 |
| EP | 3156873 | 4/2017 |
| EP | 3184013 | 6/2017 |
| GB | 2509989 | 7/2014 |
| GB | 2509990 | 7/2014 |
| GB | 2509991 | 7/2014 |
| GB | 2513912 | 11/2014 |
| JP | H04338433 | 11/1992 |
| JP | 2001125641 | 5/2001 |
| JP | 2002085305 | 3/2002 |
| JP | 2003330543 | 11/2003 |
| JP | 2003345437 A * | 12/2003 |
| JP | 2004133882 | 4/2004 |
| JP | 2005205028 | 8/2005 |
| JP | 2008047095 A | 2/2008 |
| JP | 2008140159 | 6/2008 |
| JP | 2009509673 A | 3/2009 |
| JP | 2009123045 | 6/2009 |
| JP | 2009238055 | 10/2009 |
| JP | 2009301247 | 12/2009 |
| JP | 2010066932 | 3/2010 |
| JP | 2010227894 | 10/2010 |
| JP | 2012011200 A | 1/2012 |
| JP | 2013077088 | 4/2013 |
| JP | 2013146302 | 8/2013 |
| JP | 2013537651 | 10/2013 |
| JP | 2014176260 | 9/2014 |
| JP | 201541203 | 3/2015 |
| JP | 2015536489 A | 12/2015 |
| JP | 2016192040 | 11/2016 |
| JP | 2016201095 | 12/2016 |
| KR | 20060081131 A * | 7/2006 .......... G05D 1/0219 |
| KR | 100735565 | 7/2007 |
| KR | 100815545 | 3/2008 |
| KR | 1020090013523 A * | 2/2009 .......... A47L 9/2805 |
| KR | 20110092158 | 8/2011 |
| KR | 20140073854 | 6/2014 |
| KR | 20140145648 | 12/2014 |
| KR | 20150009413 | 1/2015 |
| KR | 20150050161 | 5/2015 |
| KR | 20150086075 | 7/2015 |
| KR | 20150124011 | 11/2015 |
| KR | 20150124013 | 11/2015 |
| KR | 20150124014 | 11/2015 |
| KR | 20150127937 | 11/2015 |
| KR | 101640706 | 7/2016 |
| KR | 20160097051 | 8/2016 |
| WO | 9523346 | 8/1995 |
| WO | 9928800 | 6/1999 |
| WO | 200004430 | 1/2000 |
| WO | 2005074362 | 8/2005 |
| WO | 2007028667 | 3/2007 |
| WO | 2011074165 | 6/2011 |
| WO | 2012099694 | 7/2012 |
| WO | 2012157951 | 11/2012 |
| WO | 2013116887 | 8/2013 |
| WO | 2014017256 | 1/2014 |
| WO | 2014043732 | 3/2014 |
| WO | 2014055966 | 4/2014 |
| WO | 2014113091 | 7/2014 |
| WO | 2014138472 | 9/2014 |
| WO | 2015018437 | 2/2015 |
| WO | 2015025599 | 2/2015 |
| WO | 2015072897 | 5/2015 |
| WO | 2015082017 | 6/2015 |
| WO | 2015090398 | 6/2015 |
| WO | 2015158240 | 10/2015 |
| WO | 2015181995 | 12/2015 |
| WO | 2016019996 | 2/2016 |
| WO | 2016027957 | 2/2016 |
| WO | 2016028021 | 2/2016 |
| WO | 2016031702 | 3/2016 |
| WO | 2016048077 | 3/2016 |
| WO | 2016050215 | 4/2016 |
| WO | 2016091312 | 6/2016 |
| WO | 2016095966 | 6/2016 |

OTHER PUBLICATIONS

Patent Application_Translated_KR20090013523 (Year: 2009).*
English translation KR20060081131 (Year: 2006).*
English translation JP2003345437 (Year: 2003).*
Patent Cooperation Treaty, "International Search Report," and English-language translation thereof issued in International Application No. PCT/AT2016/060108, by European Searching Authority, document of 13 pages, dated Mar. 2, 2017.
Thrun et al., "Probabilistic Robotics"; 1999, 492 pages.
Choset et al., "Principles Of Robot Motion", Theory, Algorithms, and Implementations, Chapter 6—Cell Decompositions, 2004, document of 41 pages.
Konolige et al., "A Low-Cost Laser Distance Sensor," 2008 IEEE International Conference on Robotics and Automation, Pasadena, CA, USA, May 19-23, 2008, document of 7 pages.
Oh et al., "Autonomous Battery Recharging for Indoor Mobile Robots," Massachusetts Institute Of Technology Press, Aug. 30, 2000, document of 6 pages, XP055321836.
Siegwart, "Introduction to Autonomous Mobile Robots", Massachusetts, ISBN 978-0-26-219502-7, (2004), pp. 104-115, 151-163, 250-251, document of 37 pages. http://www.robotee.com/EBooks/Introduction_to_Autonomous_Mobile_Robots.pdf, XP055054850.
Lymberopoulos et al., "A Realistic Evaluation and Comparison of Indoor Location Technologies: Experiences and Lessons Learned," IPSN '15, Apr. 14 -16, 2015, Seattle, WA, USA, document of 12 pages. http://dx.doi.org/10.1145/2737095.27.
Durrant-Whyte et al., "Simultaneous Localization and Mapping (SLAM): Part I The Essential Algorithms", in: IEEE Robotics and Automation Magazine, vol. 13, No. 2, pp. 99-108, Jun. 2006.
Mahyuddin et al., "Neuro-fuzzy algorithm implemented in Altera's FPGA for mobile robot's obstacle avoidance mission", TENCON 2009—2009 IEEE Region 10 Conference, IEEE, Piscataway, NJ, USA, Jan. 23, 2009; document of 6 pages.
Kim et al., "User-Centered Approach to Path Planning of Cleaning Robots: Analyzing User's Cleaning Behavior." Proceedings of the 2007 ACM/IEEE Conference on Human-Robot Interaction, Mar. 8-11, 2007, pp. 373-380.
Neto et al., Human-Machine Interface Based on Electro-Biological Signals for Mobile Vehicles, 2006, IEEE, p. 2954-2959 (Year: 2006).
Forlizzi, How robotic products become social products: An ethnographic study of cleaning in the home, 2007, IEEE, p. 129-136 (Year: 2007).
Sick Sensor Intelligence, "LMS200/211/221/291 Laser Measurement Systems", Jan. 2007, pp. 1-48, XP055581229, http://sicktoolbox.sourceforge.net/docs/sick-lms-technical-description.pdf.
Vasquez-Gomez et al., "View planning for 3D object reconstruction with a mobile manipulator robot," 2014 IEEE/RSJ International Conference on Intelligent Robots and Systems, Sep. 14, 2014 IEEE, pp. 4227-4423.
Office Action issued in Japanese Patent Application No. 2021-209429 dated Feb. 3, 2023, with translation.

* cited by examiner

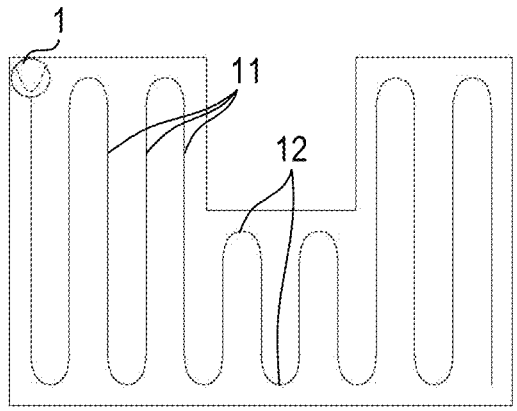
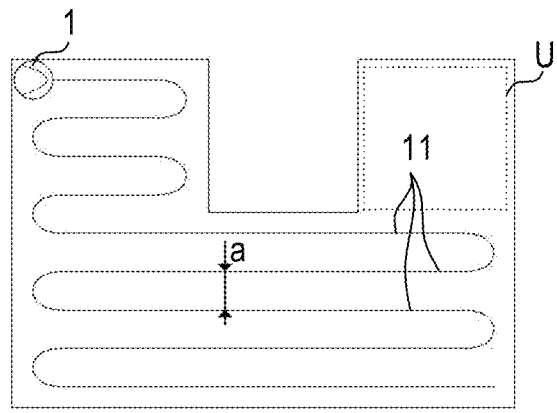
Meander aligned at the short side
Fig. 10A
Meander aligned at the long side
Fig. 10B

SUBDIVISION OF MAPS FOR ROBOT NAVIGATION

CROSS REFERENCE TO RELATED APPLICATIONS

This application is a § 371 National Phase of PCT/AT2016/060108, filed Nov. 11, 2016, the entirety of which is incorporated by reference and which claims priority to German Patent Application No. 10 2015 119 501.1, filed Nov. 11, 2015.

TECHNICAL FIELD

The present description relates to the field of autonomous mobile robots, in particular to the sectoring of maps of an area of robot operation through which the robot moves and by the means of which the robot orients itself.

BACKGROUND

There are numerous autonomous mobile robots available for a wide variety of domestic or commercial use, for example, for finishing or cleaning floor surfaces, transporting objects or inspecting an environment. Simple devices can manage this without compiling and using a map of the robot's area of operation, for example, by randomly moving over a floor surface intended for cleaning (cf. e.g. the publication EP 2287697 A2 of iRobot Corp.). More complex robots make use of a map of the area of robot operation which they compile themselves or which is made available to them in electronic form.

The map of such an area of robot operation is, as a rule, quite complex and not designed to be readable for a human user. Reading the map, however, may be necessary in order to plan the tasks that the robot is to carry out. In order to simplify the task planning, the area of robot operation can be automatedly sectored into zones. Numerous methods exist for this purpose. Known from the relevant academic literature are various abstract methods for sectoring an area intended for cleaning by means of which, for example, the planning of the robot's path through the area may be simplified or it may be ensured that the floor surface is evenly covered. Due to the fact that these abstract methods do not take into consideration typical characteristics of a human environment (e.g. an apartment), they generally suffer the deficiency of not being geared towards the needs of a user and as a result exhibit a behavior that may be difficult for the human user to understand.

One very simple method is to sector the area of robot operation into several small uniform zones of a predefined shape and size. The zones are then processed according to a standard, previously defined procedure (e.g. they are cleaned). Sectoring the area of robot operation (e.g. an apartment) into rooms such as, for example, living room, corridor, kitchen, bedroom, bathroom, etc. is easy to understand for the user. In order to achieve this, the robot (or a processor connected thereto) will try to determine the position of doors and walls with the aid of, for example, a ceiling camera, a distance sensor aimed at the ceiling, or based on typical geometric features such as, e.g. the width of a door. Another known method is to sector the area of robot operation along the borders of floor coverings, which can be detected by the robot with the aid of sensors. Sectoring the area of operation in this way makes it possible, for example, to select special cleaning methods in dependency of the kind of floor covering. The map and its zones can be shown to the human user, who may then correct the sectoring or adapt it to his/her needs, e.g. by shifting the zone borders or adding new ones.

SUMMARY

The application improves upon known methods for sectoring a map of an area of robot operation, as well as to improve and, in particular, render more flexible the use of the map itself. The disclosure provides a method and a robot having the features and structures recited herein. Various embodiments and further developments of the present disclosure are further recited herein.

A method for the automatic sectoring a map of an area of robot operation of an autonomous mobile robot is described. In accordance with one embodiment, the method comprises the following: the detection of obstacles, as well as of their size and position on the map by means of sensors arranged on the robot; the analysis of the map by means of a processor in order to detect an area in which there is a cluster of obstacles; and the definition of a first zone by means of a processor such that this first zone contains a detected cluster.

In accordance with a further embodiment, the method comprises the following: the detection of obstacles, as well as the determination of their size and position on the map by means of sensors arranged on the robot; the analysis of the map by means of a processor, wherein, based on at least one specifiable criterion, hypotheses concerning possible zone borders and/or the function of individual detected obstacles are automatedly generated; and the sectoring of the area of robot operation into zones based on the generated hypotheses.

In accordance with still a further embodiment, the method comprises the detection of obstacles in the form of boundary lines, as well as the determination of their size and position on the map by means of sensors arranged on the robot; the sectoring of the area of robot operation into numerous zones based on the detected boundary lines and on specifiable parameters; and the depiction of the map, including the zones and the detected doorways, on a human-machine interface, wherein, in response to a user input concerning the specifiable parameters, the sectoring of the area of robot operation into zones, the position of doors and/or the designation of the functions of the detected zones is maintained and the sectoring of the area of robot operation is altered in dependence on the user input.

In accordance with a further example of the embodiment, the method comprises the detection of obstacles in the form of boundary lines, as well as the determination of their size and position on the map by means of sensors arranged on the robot and the sectoring, in numerous hierarchical stages, of the area of robot operation into numerous zones based on the detected boundary lines and specifiable parameters. In the course of this, during a first stage of the hierarchical stages the area of robot operation is sectored into numerous first stage zones. During a second stage of the hierarchal stages, the numerous first stage zones are further sectored into second stage zones.

A further method described here for the automatic sectoring of a map of an area of robot operation of an autonomous mobile robot comprises the detection of obstacles in the form of boundary lines, as well as the determination of their size and position on the map by means of sensors arranged on the robot. The method further comprises overlaying the boundary lines with a first rectangle such that every point that is accessible by the robot lies within the rectangle, as well as dividing the first rectangle into at least two adjacent second rectangles, wherein the border line(s) between two adjacent second rectangles traverse(s) boundary lines that are determined in accordance with specifiable criteria.

Further, a method for the automatic planning of the operation of an autonomous mobile robot in numerous zones of an area of robot operation is described. In accordance with one embodiment, the method comprises the receiving of a target processing duration by the robot, as well as the automated selection of the zones that are to be processed within the target processing duration, as well as their order of processing, based on the attributes assigned to the zones, for example priorities and/or an anticipated processing duration of the individual zones and the target processing duration.

A further example of a method for the automatic sectoring of a map of an area of robot operation of an autonomous mobile robot comprises the detection of obstacles, as well as the determination of their size and position on the map by means of sensors arranged on the robot, as well as the sectoring of the area of robot operation based on the detected obstacles, wherein movable obstacles are identified as such and are not considered when sectoring the area of robot operation so that the sectoring is independent of a specific position of the movable obstacle.

A further example of the method comprises the detection of obstacles, as well as the determination of their size and position on the map by means of sensors arranged on the robot, as well as the sectoring of the area of robot operation based on the detected obstacles, wherein, for the determination of the position of at least one of the detected obstacles, positions are used that were detected at various points in time in the past.

Further, a method for the localization of an autonomous mobile robot on the map of the area of robot operation is described, wherein at least one zone in which there is at least one cluster of obstacles is marked on the map. In accordance with one embodiment, the method comprises the detection of obstacles, as well as the determination of their size and position by means of a sensor arranged on the robot, the determination of a position of the robot relative to an area containing a cluster of obstacles, as well as the determination of a position of the robot on the map based on the relative position and on a position of the area containing the cluster of obstacles on the map.

Further embodiments concern a robot that is connected with and internal and/or external data processing device, the device being configured to execute a software program which, when executed by the data processing device, causes the robot to carry out the method described here.

BRIEF DESCRIPTION OF THE FIGURES

In the following, the disclosure will be described in detail by means of the examples shown in the figures. The illustrations are not necessarily true to scale and the application is not limited to only the illustrated aspects. Instead, importance is given to illustrating the principles underlying the application.

FIG. 5 shows the further sectoring of a zone shown in FIG. 4 based on detected areas that are difficult to pass through.

FIGS. 8A to 8E show the procedure of automated detection of an area of robot operation or of a zone that is difficult to pass through.

FIGS. 10A and 10B show schematically the assignment of a robot path to a zone.

DETAILED DESCRIPTION

Figure 1:
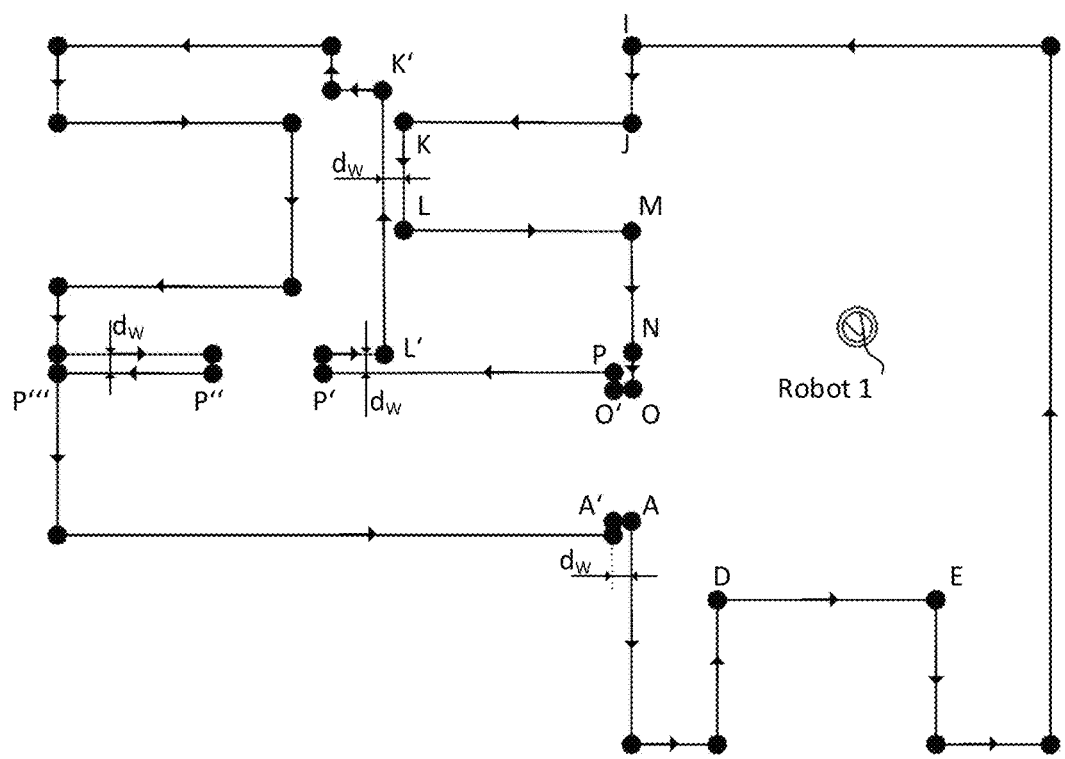
FIG. 1 shows a map, automatedly generated by a mobile robot, of an area of robot operation (an apartment) with numerous boundary lines.

A technical device is of the greatest use for a human user in daily life when, on the one hand, the behavior of the device is logical and understandable for the user and, on the other hand, when its operation can be intuitively carried out. The user expects of an autonomous mobile robot, such as a floor cleaning robot ("robot vacuum cleaner"), for example, that it will adapt itself (with regard to its mode of operation and behavior) to the user. For this purpose, the robot should, by means of technical methods, interpret its area of operation and sector it into zones (e.g. living room, bedroom, corridor, kitchen, dining area, etc.) in a way in which the human user would also do so. This allows for a simple communication between the user and the robot, for example in the form of commands given to the robot (e.g. "clean the bedroom") and/or in the form of information given to the user (e.g. "cleaning of the bedroom is completed"). In addition to this, the mentioned zones may be used to depict a map of the area of robot operation that itself may be used to operate the robot.

A sectoring of the area of robot operation into zones can be carried out by a user, on the one hand, in accordance with known conventions and, on the other hand, in accordance with personal preferences (and thus, user specifically, e.g. dining area, children's play corner, etc.). One example of a known convention is the sectoring of an apartment into various rooms such as, e.g. bedroom, living room and corridor (cf. FIG. 3). In accordance with an exemplary user specific sectoring, a living room could be sectored, e.g. into a cooking area, a dinette or into zones in front of and next to the sofa (cf. FIG. 4). The borders between these zones may sometimes be very "unclearly" defined and are, in general, subject to the interpretation of the user. A cooking area, for example, may be designated by a tile floor while the dining area may only be characterized by the presence of a table and chairs. The adaptation to the human user may be a very difficult task for the robot and a robot-user interaction may often be necessary in order to correctly carry out the sectoring of the area of robot operation. In order that this robot-user interaction be realized simply and understandably, the map data and the previously automatically executed sectoring must be interpreted and processed by the device. Further, the human user will expect the behavior of the autonomous mobile robot to be adapted to the generated sectoring. For this reason, the zones should be able to be furnished, by the user or automatically by the robot, with attributes that influence the behavior of the robot.

One technical prerequisite for this is that the autonomous mobile robot possess a map of its area of operation, so that it can orient itself by means of the map. The map can, for example, be compiled by the robot independently and permanently saved. In order to achieve the goal of a sectoring of the area of robot operation that is intuitive for the user, technical methods are needed that (1) independently carry out a sectoring of the map of the area of robot operation such as, for example, an apartment, in accordance with given rules, (2) that allow for a simple interaction with the user, in order that the sectoring be adapted to the user's preferences that are not known a-priori, (3) that preprocess the automatically generated sectoring in order that it be simply and understandably depicted to the user on a map, and (4) that it be possible for certain features to be inferred from the thereby generated sectoring as autonomously as possible, and that these features be suitable for achieving a behavior that is expected by the user.

FIG. 1 shows a possible depiction of a map of an area of robot operation as compiled by the robot, e.g. by means of sensors and a SLAM algorithm. For example, the robot measures the distance to obstacles (e.g. a wall, a piece of furniture, a door, etc.) and calculates line segments that define the borders of its area of operation based on the measurement data (usually a point cloud). The area of robot operation may be defined, for example, by a closed chain of line segments (usually a concave simple polygonal chain), wherein every line segment comprises a starting point, an end point and, consequently, a direction. The direction of the line segment indicates which side of the line segment is facing the inside of the area of operation, that is, from which side the robot "saw" the obstacle designated by a given line segment. The polygon shown in FIG. 1 completely describes the area of operation for the robot but is very poorly suitable for the robot-user communication. Under certain circumstances, a human user will have difficulty recognizing his own apartment and orienting himself on the map. One alternative to the aforementioned chain of line segments is a raster map, in the case of which a raster of, e.g. 10×10 cm is placed over the area of robot operation and every cell (i.e. every 10×10 cm box) is marked if it is occupied by an obstacle. Such raster maps, however, can also only be interpreted by a human user with great difficulty.

Simplifying the interaction with a human user is not the sole reason for the robot to first automatedly sector its area of operation into zones, but also in order to logically (from the viewpoint of the user) "work through" the area of operation. Such a sectoring into zones allows the robot to carry out its task in its area of operation more easily, more discriminatingly, and (from the viewpoint of the user) more logically, and improves interaction with the user. In order to achieve an appropriate sectoring, the robot must relate various sensor data to each other. In particular, it can make use of information on the accessibility (difficult/easy) of a sector of its area of operation to define a zone. Further, the robot may operate on the (disprovable) assumption, that rooms, as a rule, are rectangular. The robot can learn that some alterations to the sectoring can lead to more logical results (such as, e.g. that with a certain degree of probability, certain obstacles will lie within a certain zone).

As shown in FIG. 1, a robot is usually capable of detecting obstacles with the aid of sensors (e.g. laser distance sensors, triangulation sensors, ultrasonic distance sensors, collision sensors or any combination of the above) and of delineating on a map the borders of its area of operation in the form of boundary lines. However, the limited sensor system of a robot does not generally allow for a sectoring into various rooms (e.g. bedroom, living room, corridor, etc.) that is readily understandable for a human user. Even determining whether a boundary line found on the map (for example, the line between the points J and K in FIG. 1) belongs to a wall or a piece of furniture cannot easily be carried out automatedly. The "border" between two rooms may also not be easily recognized by the robot.

In order to solve the above mentioned problems and to allow for an automated sectoring of the area of robot operation into various zones (e.g. rooms), the robot generates, based on the sensor data, "hypotheses" about its environment that can be tested using various methods. If a hypothesis can be proved false, it is rejected. If two boundary lines (e.g. the lines A-A' and O-O' in FIG. 1) are more or less parallel and are at a distance to each other that corresponds to the common clear width of a door frame (for this there are standardized values), then the robot will generate the hypothesis "door frame" and conclude from this that the two lines separate two different rooms. In the simplest case, the robot can test an automatedly generated hypothesis by "asking" the user, i.e. by requesting the user's feedback. The user can then either confirm or reject the hypothesis. A hypothesis can also be tested automatedly, however, in which case the plausibility of the conclusions drawn from the hypothesis is tested. If the rooms detected by the robot (e.g. by means of detection of the door thresholds) include a central room that, e.g., is smaller than one square meter, then the hypothesis that ultimately led to this small central room is probably false. A further automated test may consist in testing whether or not conclusions drawn from two hypotheses contradict each other. If, for example, six hypotheses indicating a door can be generated and the robot can only detect a door threshold (a small step) in the case of five of the assumed doors, then this may be an indication that the hypothesis that indicates a door without a threshold is false.

Various sensor measurements are combined when a hypothesis is tested by the robot. In the case of a doorway, for example, the tested measurements include the passage width, the passage depth (given by the thickness of the wall), the existence of a wall to the right and to the left of the doorway or of an open door extending into the room. All this information can be detected, for example, by the robot with the aid of a distance sensor. By means of an acceleration sensor or of a position sensor (e.g. a gyroscopic sensor), the possible existence of a door threshold can be detected when the robot passes over it. With the use of image processing and by measuring the height of the ceiling, additional information can be gathered.

A further example of a possible hypothesis is the run of walls in the area of robot operation. These may be designated, among others, by two parallel lines that are at a distance to each other which corresponds to the common thickness of a wall (see FIG. 1, thickness $d_w$) and that are seen by the robot from two opposite directions (e.g. the lines K-L and L'-K' in FIG. 1). However, additional objects (obstacles) such as, for example, wardrobes, shelves, flower pots, etc. may also be standing against a wall and may be able to be identified with the aid of hypotheses. One hypothesis may rest upon another hypothesis. For example, a door is a discontinuation of a wall; so when reliable hypotheses about the run of walls in the area of robot operation can be generated, these may be used to identify doors and to thus simplify the automated sectoring of the area of robot operation.

To test and evaluate hypotheses, a degree of plausibility may be assigned to them. In one simple embodiment, a hypothesis is credited with a previously specified number of points for every confirming sensor measurement. When, in this manner, a certain hypothesis achieves a minimum number of points, it is regarded as plausible. A negative total number of points could result in the hypothesis being rejected. In a further developed embodiment, a probability of being correct is assigned to a certain hypothesis. This requires a probability model that takes into account the correlation between various sensor measurements but also allows complex probability statements to be generated with the aid of stochastic calculation models, thus resulting in a more reliable prediction of the user's expectations. For example, in certain regions (i.e. countries) in which the robot is operated, the width of doors may be standardized. If the robot measures such a standardized width, then this most probably relates to a door. Deviations from the standard widths reduce the probability that they relate to a door. For this purpose, for example, a probability model based on a standard distribution may be used. A further possibility for the generation and evaluation of hypotheses is the use of "machine learning" to generate suitable models and measurement functions (see, e.g. Trevor Hastie, Robert Tibshirani, Jerome Friedman: "*The Elements of Statistical Learning*", $2^{nd}$ edition, Springer Publishing House, 2008). For this purpose, for example, map data is gathered by one or more robots in various living environments. The data can then be supplemented with floor plans or further data input by the user (e.g. regarding the run of doors or doorways or regarding a desired sectoring) and can then be evaluated by a learning algorithm.

A further method that may be employed alternatively or additionally to the hypotheses described above is the sectoring of the area of robot operation (e.g. an apartment) into numerous rectangular zones (e.g. rooms). This approach is based on the assumption that rooms, as a rule, are rectangular or are composed of numerous rectangles. On a map compiled by a robot, this rectangular form of the rooms cannot generally be recognized as, in the rooms, numerous obstacles with complex borders such as, e.g. furniture, limit the robot's area of operation.

Based on the assumption of rectangular rooms, the area of robot operation is overlaid with rectangles of various sizes that are intended to represent the rooms. In particular, the rectangles are selected in such a manner so that a rectangle may be clearly assigned to every point on the map of the area of robot operation that is accessible to the robot. This means that the rectangles generally do not overlap. Nevertheless it is not to be excluded that a rectangle may contain points that are not accessible to the robot (e.g. because pieces of furniture make access impossible). The area designated by the rectangles may thus be larger and of a simpler geometric form than the actual area of robot operation. In order to determine the orientation and size of the individual rectangles, long boundary lines in the map of the area of robot operation, for example, are employed such as those e.g. that run along a wall (see, e.g., FIG. 1, straight line through the points L' and K', straight line through the points P and P' as well as P''' and P''''). Various criteria are used for the selection of the boundary lines to be used. One criterion may be, e.g. that the boundary line in question be nearly parallel or orthogonal to numerous other boundary lines. A further criterion may be that the boundary lines in question lie approximately on one straight line and/or that they be relatively long (e.g. in the general range of the outer dimensions of the area of robot operation). Other criteria for selecting the orientation and size of the rectangles are, for example, detected doorways or the borders of floor coverings. In order to assess these and other criteria, they may be used in one or more weighting functions (analogously to the degree of plausibility of a hypothesis, e.g. to assigning a number of points to a hypothesis) in order to determine the specific form and position of the rectangles. For example, points are given to the boundary lines for fulfilled criteria. The boundary line with the highest number of points will then be used as the border between two rectangles.

Figure 2:
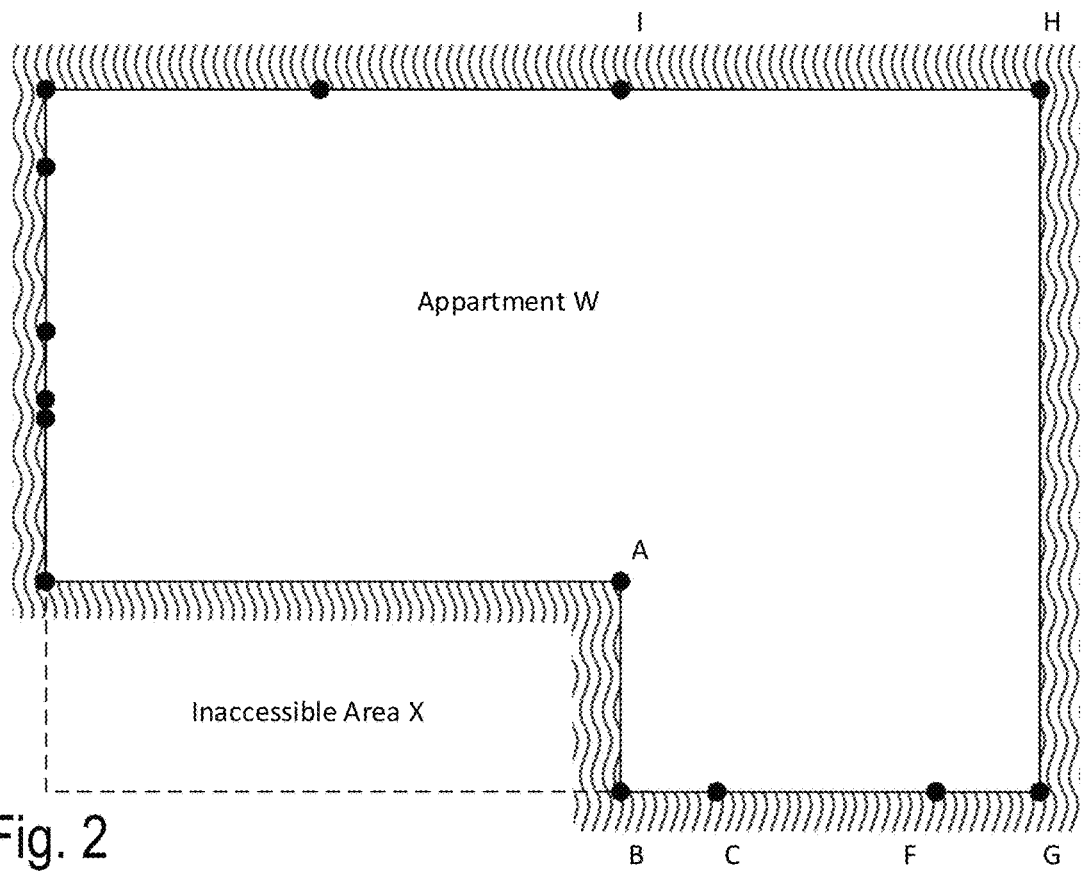
FIG. 2 shows the outer borders of the area of robot operation shown in FIG. 1, determined based on the measurement values (boundary lines).

Based on the assumption that rooms are generally rectangular, the robot can supplement the outer boundary lines of the map of boundary lines (see FIG. 1) to form a rectilinear polygon. The result of this is shown in FIG. 2. It is also possible to place a rectangle through the outer boundary lines of the apartment (see FIG. 2, rectangle that encompasses the apartment W and the inaccessible area X) and to remove from them inaccessible areas (see FIG. 2, area X). Based on detected doors (see FIG. 1, door threshold between the points O and A, as well as between P' and P''') and inner walls (see FIG. 1, antiparallel boundary lines in the distance $d_w$), the apartment can be automatedly sectored into three rooms 100, 200 and 300 (see FIG. 3). When doing so, areas determined to be walls are extended to a door or to the outer boundary of the apartment. Inaccessible areas within the rooms can be interpreted by the robot to be pieces of furniture or other obstacles and can be correspondingly designated on the map (see FIG. 4). For example, the piece of furniture 101 may even, based on its dimensions (distances separating the boundary lines), be identified as a bed (beds have standardized sizes) and consequently, room 100 can be identified as a bedroom. The area 102 is identified as a chest of drawers. However, it may also be a shaft or a chimney.

Figure 4:
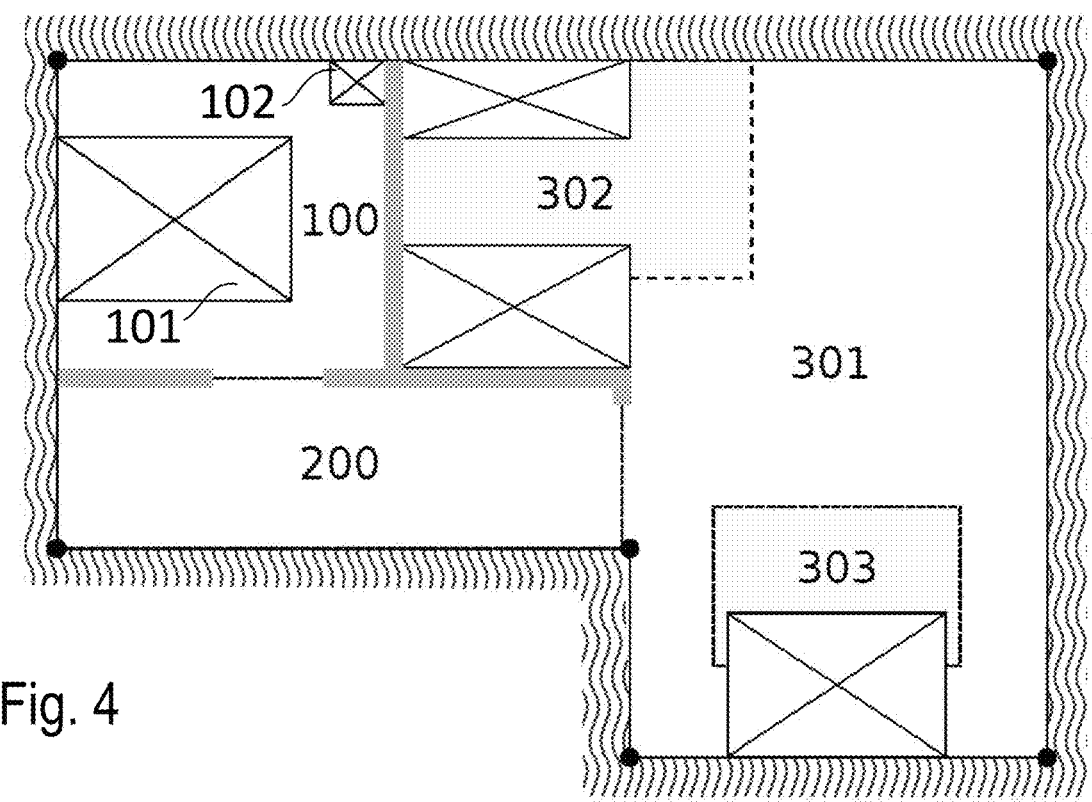
FIG. 4 shows the further sectoring of the area of robot operation shown in FIG. 3, wherein inaccessible areas (furniture) have been interpreted.

The room 300 can be sectored based on the sensor data recorded by the robot (see FIG. 4). For example, one criterion for a further sectoring may be the floor covering. With the aid of sensors, the robot can distinguish, for example, between a tiled floor, a wooden floor or a carpet. Usually two different floor coverings are separated by a slightly uneven (detectable) border and the slipping behavior of the wheels may differ for different floor coverings. Various floor coverings also differ from each other with regard to their optical characteristics (color, reflection, etc.). In the present example, the robot recognizes in room 300 a zone 302 with a tiled floor and a zone 303 with a carpet. The remaining zone 301 has a wooden floor. The tiled area 302 may be interpreted by the robot to be, e.g. a kitchen area.

Until now, comparatively small obstacles have not been taken into account, wherein "comparatively small" means that the obstacles are of a similar size to that of the robot or smaller. In the upper right hand part of FIG. 5 in zone 301 of the room 300, numerous small obstacles are designated on the robot's map that are only a few centimeters large. One criterion for the further sectoring of the room 300 (or of the zone 301) may also be the passability of a zone in the area of robot operation. In the case shown in FIG. 5, the zone designated 320 contains a great number (a cluster) of smaller obstacles (e.g. table legs and chair legs), which prevent the robot from rapidly moving forward. If the robot wants to quickly move from one point to another (e.g. to a charging station), it would be more efficient to not take the most direct route and to instead move around areas containing a large number of small obstacles. Consequently, it would be useful to define areas which are difficult to pass through because of the presence of a large number of small obstacles as separate zones. For this purpose the robot can be configured to analyze the map in order to recognize an area on the map containing a cluster of obstacles that are distributed throughout the area such that the straight-line progression of the robot through the area is blocked by the obstacles. "Blocked" in this case need not mean that a straight-line passage is impossible. It is already enough if there is no straight-line path leading through the zone that the robot could follow while observing a certain safety distance to the obstacles or if a small variation (a rotation or a shift) along the straight-line path might result in a collision with one of the obstacles. Once such an area containing a cluster of obstacles is recognized, the robot defines a zone such that the first zone contains the detected cluster.

In the present example (FIG. 5) the area in the upper right hand part of zone 301 is therefore defined as zone 320, to which the attribute "difficult to pass" is assigned. The remaining part of zone 301 (see FIG. 4) is designated as zone 310. Based on the size and number of the individual obstacles, the robot could even identify the obstacles as table and chair legs and define the area 320 as "dinette". A cleaning interval or cleaning method, for example, could also be assigned to zone 320 that differs from that assigned to the other zones. A cluster of obstacles can also be recognized by the robot, for example, when each of the obstacles (e.g. their base area or their diameter) is smaller than a specifiable maximum value and when the number of obstacles is greater than a specifiable minimum value (e.g. five).

The borders of "difficult to pass" zones are geometrically not clearly defined (as opposed to, e.g. the borders between different floor coverings). However, hypotheses concerning their positions can be generated on the basis of desired features of the zone to be created and of a complementary zone (see FIG. 4, difficult-to-pass zone 320, complimentary zone 310). As criteria for the demarcation of a difficult-to-pass zone, the robot may apply, e.g. the following rules: (1.) The difficult-to-pass zone should be as small as possible. (2.) The zone should encompass small obstacles, that is, for example, obstacles having a base area that is smaller than that of the robot or whose longitudinal extension is smaller than the diameter of the robot. (3.) The small obstacles do significantly impede, because of their number and particular distribution, a straight-line progression of the robot; as opposed to which, for example, a single chair in the middle of an otherwise empty room does not define an individual zone. (4.) The boundaries of the difficult-to-pass zone should be chosen such that it will be possible to clean around every small obstacle without the robot having to leave the zone to do so. The difficult-to-pass zone should therefore encompass an area that includes a space at least as wide as the diameter of the robot around each obstacle. (5.) The difficult-to-pass zone should have a geometric form that is as simple as possible such as, for example, a rectangle or a rectilinear polygon. (6.) The complementary zone (that is created by the demarcation of a difficult-to-pass zone) should be easy to move through or to clean. It should therefore, in particular, contain no exceptionally small isolated areas, long, narrow strips or pointed corners.

Figure 7:
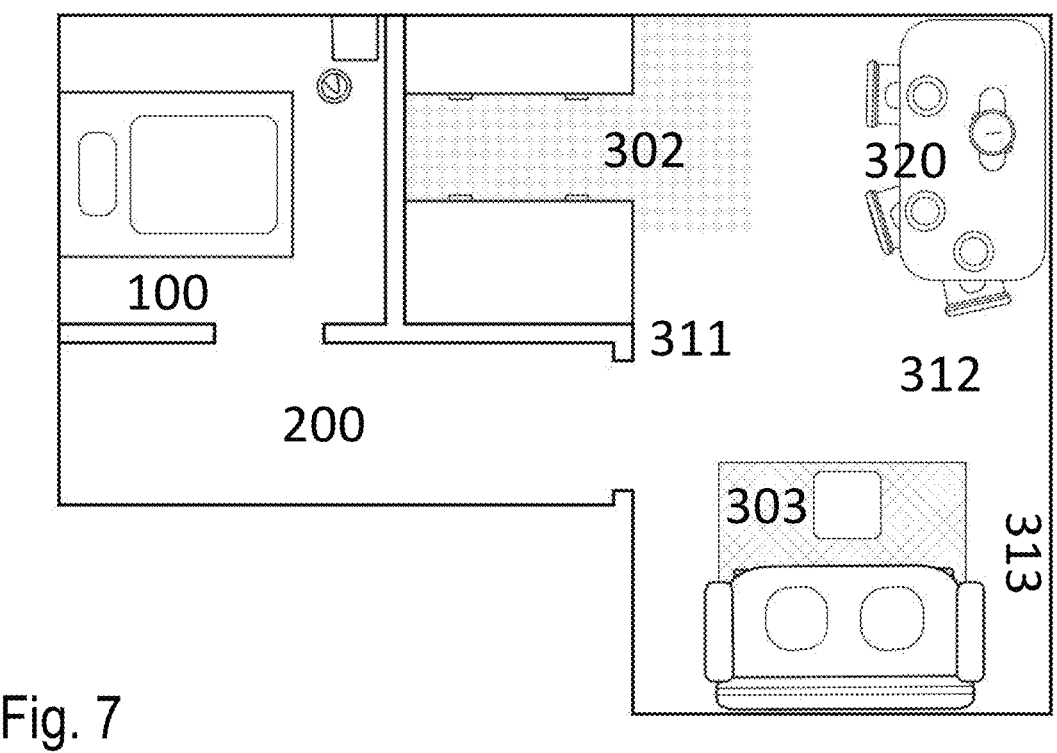
FIG. 7 corresponds to the illustration shown in FIG. 6, wherein floor coverings and furniture have been designated.

In the present example, by demarcating the difficult-to-pass zone 320 from the zone 301 (see FIG. 4), the complementary zone 310 is formed which itself can be further sectored into smaller, essentially rectangular zones 311, 312 and 313. This sectoring is oriented along the already existing zone borders. For example, the zone 311 is created by "extending" the border between the zones 320 (dinette) and 302 (cooking area) down to the zone 303 (carpet). The zones 312 and 313 are created by extending the border of the zone 303 (carpet) to the outer wall. For a better understanding of the final sectoring of the apartment it is illustrated, together with furniture, in FIG. 7.

FIG. 8 shows a further example of the further sectoring of a zone (a room) into smaller zones by making use of the above mentioned property of passability. FIG. 8A shows in a plan view an example of a room with a dinette that includes a table, six chairs and a sideboard. FIG. 8B shows the map compiled by a robot with boundary lines similar to those of the earlier example shown in FIG. 2. At the table's position the robot "sees" a number of smaller obstacles (table and chair legs) that prevent the robot from moving in a straight line (e.g. from passing under the table). The sideboard is shown as an abstract piece of furniture. To begin with, the robot identifies the relatively small obstacles (table and chair legs, cf. above rules 2 and 3), puts them into groups and surrounds them with a polygon that is as small as possible (see FIG. 8C, cf. above rule No. 1). In order to assign the simplest geometric form possible to the demarcated zone "dinette", the robot attempts to arrange a rectangle around the polygon (cf. above rule No. 5), wherein the rectangle must maintain a minimum distance to the polygon. This minimum distance should be large enough so that the robot need not move out of the zone "dinette" while cleaning it (cf. above rule 4). In general, therefore, the minimum distance will be at least as large as the diameter (or the maximum outer dimension) of the robot. In other cases such as, e.g. in that of a U-shaped arrangement of several tables, as is commonly found in meeting rooms, it may be advantageous not to define a group of smaller obstacles as one rectangular zone but rather as numerous (adjacent) rectangular zones. In the present example, the rectangular zone as shown in FIG. 8D is arranged parallel to the outer wall. Other possibilities for determining an optimum orientation of the rectangle include selecting a minimal surface area of a rectangle or orienting the rectangle in accordance with the main axes of inertia (the main axes of the covariance matrix) of the distribution of the smaller obstacles.

Figure 8A:
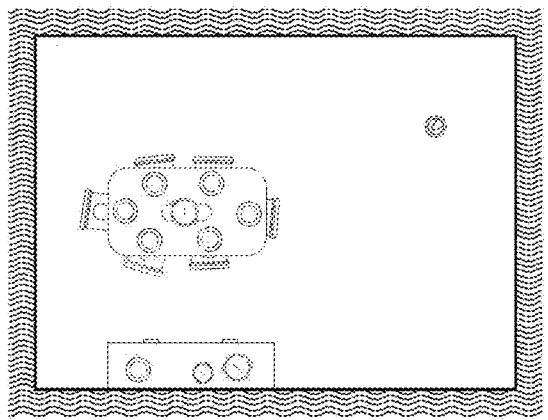
Figure 8B:
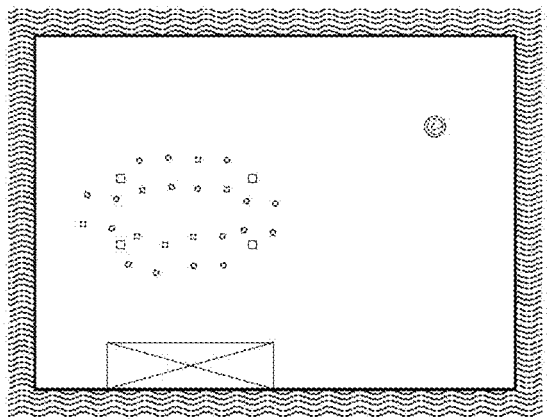
Figure 8C:
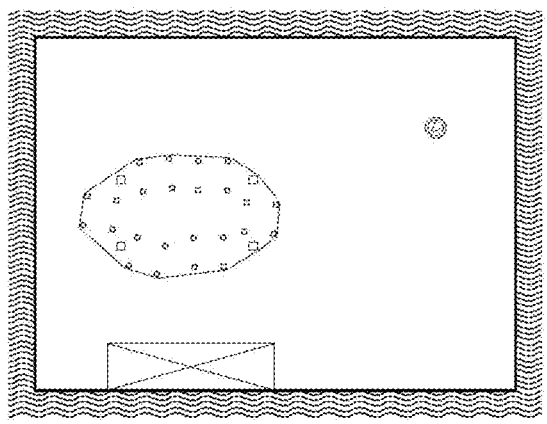
Figure 8D:
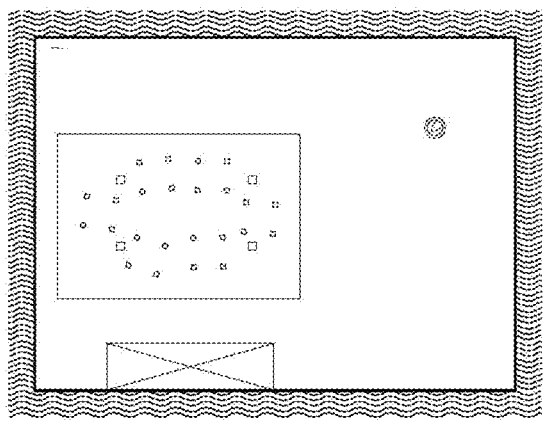
Figure 8E:
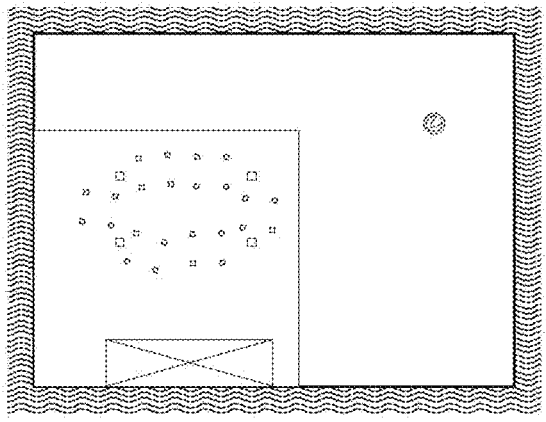

In order to avoid the creation of narrow, difficult-to-pass areas in the complementary zone (cf. above rule 6), narrow areas between the (outer) wall and the rectangular zone (FIG. 8D) are added to the previously delineated rectangle. The result of this is shown in FIG. 8E.

A further possibility for the sectoring of an area of robot operation is illustrated by means of FIG. 9. In many cases, however, an area of robot operation can be comprised of rectangles that have a common border that is not blocked by obstacles. These rectangles can be combined into a rectilinear polygon. This can represent, for example, a room with a bay or the room 330 that consists of a living and dining area from the example in FIG. 3. In the following, one possible procedure for sectoring an area of robot operation will be illustrated in greater detail using the example apartment of FIG. 7. The basis for this is the measurement data gathered by the robot while measuring the distances to obstacles, i.e. the chain of boundary lines depicted in FIG. 1. This measurement data may contain measurement errors, as well as information that is irrelevant for a map sectoring and which can be eliminated by means of filtering. This makes it possible, for example, to leave small obstacles (small in relation to the entire apartment, to a room or to the robot) unconsidered in the following.

In order to generate a simplified model of the area of robot operation, based on the map of the boundary lines detected by the robot (see FIG. 1), boundary lines that run nearly perpendicular to each other are aligned vertically and boundary lines that run nearly parallel to each other are aligned horizontally (regularization). To this end, for example, a first preferred axis (e.g. parallel to the longest boundary line or the axis to which the greatest number of boundary lines are almost parallel) is determined. After this, for example, all boundary lines that form an angle of less than 5° with the preferred axis are rotated around their center point until they run parallel to the preferred axis. An analogous procedure is performed with the boundary lines that run almost perpendicular to the preferred axis. Diagonally slanted boundary lines are left unconsidered in the example illustrated here. In the following step, the simplified (map) model thus obtained is enclosed by a rectangle 500 such that the entire area of robot operation is encompassed within the rectangle (see FIG. 9A). In doing so, the rectangle 500 is arranged, for example, along the preferred axes (vertical and horizontal) obtained by means of the regularization. In the following step, the rectangle 500 is sectored into two smaller rectangles 501 and 502 in accordance with specified rules (see FIG. 9B), wherein in the present case, the rectangle 500 is sectored such that the common edge (see FIG. 9B, edge a) of the resulting rectangles 501 and 502 traverses a door frame. The rectangle 502 is further sectored into rectangles 503 and 504. The common edge (see FIG. 9B, edge b) of the rectangles 503 and 504 traverses the boundary line that represents the outer wall. The result is shown in FIG. 9C. The rectangle 503 concerns a completely inaccessible area and it is too large to be a piece of furniture. The area 503 may therefore be eliminated from the map. The rectangle 504 is further sectored into rectangles 505, 507 and 508. The common edge (see FIG. 8C, edge d) of the rectangles 507 and 508 traverses a boundary line determined to be an inner wall (cf. FIG. 1, line L'-K'). The common edge (see FIG. 8C, edge c) of the rectangles 505 and 507 (as well as of rectangles 505 and 508) traverses a detected door (cf. FIG. 1, line P'-P''). The result is shown in FIG. 9D.

With regard to the example above, a rectangle can thus be divided along sector lines that are determined, e.g. on the basis of previously adjusted boundary lines running parallel or perpendicular to the edges of the rectangle being divided. In the present example, these are the numerous boundary lines running along a straight line (see FIG. 9A, boundary lines a and c) and/or comparatively long segments (see FIG. 9A, boundary lines b and d), wherein "comparatively long" means that the boundary line in question is of a length that stands in relation to the width of the apartment (e.g. longer than 30% of the apartment's narrow side). Which sector line is to serve as the basis for dividing a rectangle into two rectangles can be determined by applying various rules. These rules may concern the absolute or relative lengths of the boundary lines of the rectangle that is to be divided or those of the resulting rectangles. In particular, the rules take into account (1.) boundary lines having parallel boundary lines close by at a distance that corresponds to the thickness of a wall (see FIG. 1, thickness $d_W$, FIG. 9A, boundary lines c and d); (2.) numerous aligning boundary lines (see FIG. 9A, boundary lines a and c); (3.) detected doorways (aligning boundary lines at a distance that corresponds to a typical door width); (4.) boundary lines that delineate inaccessible areas (see FIG. 9A, boundary line b); (5.) the absolute size and/or side ratios of the generated rectangles (rectangles with very high or very low side ratios are avoided); and (6.) the size of the rectangle to be divided.

Figure 9A:
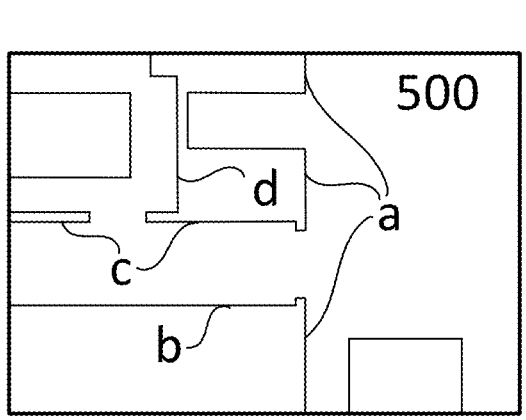
FIGS. 9A to 9F show a further procedure for the sectoring of an area of robot operation by means of the successive division of rectangles.
Figure 9B:
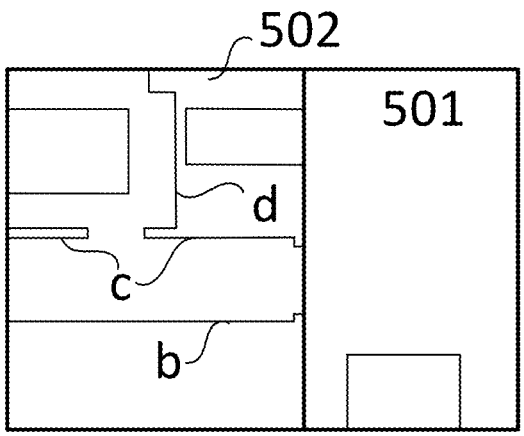
Figure 9C:
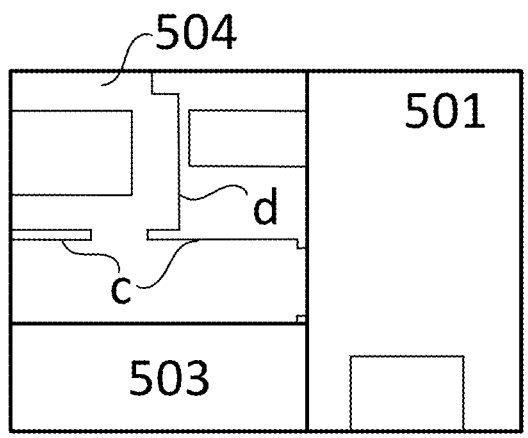
Figure 9D:
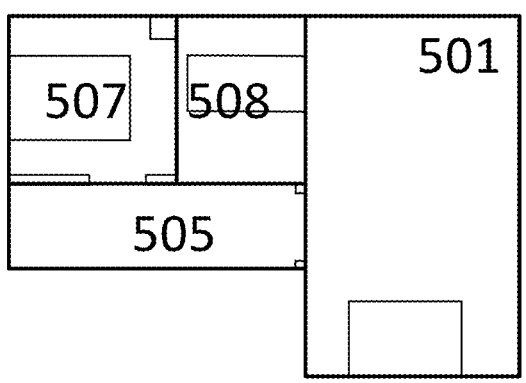

As the rules mentioned above stipulate, there are no relevant sectoring possibilities in rectangle 501 (FIG. 9B). The rectangle 503 (FIG. 9C) is demarcated off of the rectangle 502 because the boundary line traverses the entire larger rectangle 502. The rectangle 505 (FIG. 9D) is demarcated off of the larger rectangle 504 because a door has been detected along the boundary line c and the two boundary lines designated as c align. The demarcation is carried out along the boundary line d because this line completely traverses the rectangle (507 and 508 together) to be divided. Furthermore, a wall can be detected along the boundary line d.

Figure 9E:
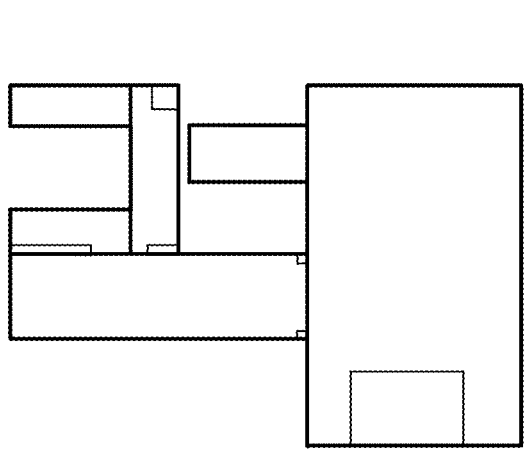
Figure 9F:
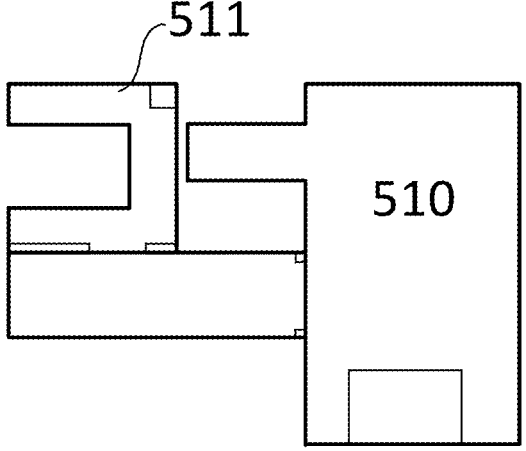

In accordance with the criteria that are used to divide the rectangles, the rectangles 507 and/or 508 can be further divided. This results, for example, in zones as shown in FIG. 9E. The thus obtained rectangles are relatively small, hence it tested whether they can be added on to other rectangles. For example, the zone formed by rectangle 508 has a good connection to 501 (meaning there are no obstacles such as, e.g. walls, lying in between that completely or partially separate the two zones from each other), and so it can be added on to it (see FIG. 9F, zone 510). The rectangles generated from rectangle 507 can also be once again combined into one, which would effectively eliminate the large inaccessible central zone (a bed in the bedroom) (see FIG. 9F, zone 511).

A human user expects that a sectoring of an area of robot operation that he knows well, once generated, will not fundamentally change during or after a use of the robot. Nevertheless, the user will probably accept a few optimizations aimed at improving the robots functioning. Firstly, the basis for the sectoring of a map can be altered from one use to another by displaceable objects. The robot must therefore eventually "learn" a sectoring that is not disrupted by these displacements. Examples of movable objects include doors, chairs or furniture on rollers. Image recognition methods, for example, may be used to detect, classify and once again recognize such objects. The robot can mark objects identified as displaceable as such and, if needed, recognize them at a different location during a later use.

Only objects with a permanent location (such as, for example, walls and larger pieces of furniture) should be used for a long term sectoring of the area of robot operation. Objects that are constantly found at varying locations can be ignored for the sectoring. In particular, a singular alteration in the robot's environment should not lead to a renewed compilation and sectoring of the map. Doors may be used, for example, to specify the border between two rooms (zones) by comparing open and closed states. Furthermore, the robot should take note of a zone that is temporally inaccessible due to a closed door and, if needed, inform the user of this. A zone that was not accessible during a first exploratory run of the robot because of a closed door but which is newly identified during a subsequent run is added to the map as a new zone. As mentioned above, table and chair legs may be used to demarcate a difficult-to-pass zone. Chair legs, however, may change their position during use, which may result in variations in the zone borders at different points in time. Therefore, the border of a difficult-to-pass zone can be adjusted over time so that, in all probability, all chairs will be found within the zone determined to be difficult to pass. This means that, based on the previously saved data on the position and size of obstacles, the frequency, and thus the probability (i.e. the parameter of a probability model) of finding an obstacle at a particular location can be determined. For example, the frequency with which a chair leg appears in a certain area can be measured. Additionally or alternatively, the density of chair legs in a given area, determined by means of numerous measurements, can be evaluated. Here, based on the probability model, the zone determined to have a cluster of obstacles can be adapted such that obstacles will be found, with a specified degree of probability, within this zone. This will result, as the case may be, in an adjustment of the borders of the "difficult-to-pass" zone containing the cluster of (probably present) obstacles.

In addition to this there are object such as, for example, television armchairs, that are generally located at a similar position in a room, but whose specific position may (insignificantly) vary under the influence of a human user. At the same time, such an object may be of a size that allows it to be used to define a zone. This may be, for example, "the area between the sofa and the armchair". For these objects (e.g. the television chair), the most likely expected position is, over time, determined (e.g. on the basis of the median, of the expectation value or of the mode). This is then used for a long-term sectoring of the map and a final interaction with the user (e.g. when the user operates and controls the robot).

In broad terms, the user can be provided with the possibility to review the automatedly generated sectoring of the map and, if necessary, modify it. The goal of the automated sectoring is nevertheless to obtain a sectoring of the map that is as realistic as possible automatedly and without interaction with the user.

Broadly speaking it should be said, when reference is made here to a sectoring of the map "by the robot", that the sectoring can be carried out by a processor (including software) arranged in the robot, as well as on a device that is connected with the robot and to which the measurement data gathered by the robot is sent (e.g. via radio). The map sectoring calculations may therefore also be carried out on a personal computer or on an Internet server. This generally makes little difference to the human user.

By appropriately sectoring its area of operation into zones, a robot can carry out its tasks "more intelligently" and with greater efficiency. In order to better adapt the robot's behavior to the expectations of the user, various characteristics (also called attributes) of a zone can be detected, assigned to a zone or used to create a zone. For example, there are characteristics that make it easier for the robot to localize itself within its area of operation after, for example, being carried to a soiled area by the user. The localization allows the robot to independently return to its base station after completing the cleaning. Characteristics of the environment that can be used for this localization include, for example, the type of floor covering, a distinctive (wall) color, and the field strength of the WLAN or other characteristics of electromagnetic fields. In addition to this, small obstacles may provide the robot with an indication of its position on the map. In this case, the exact position of the obstacles need not be used, but only their (frequent) appearance in a given area. Other characteristics either influence the behavior of the robot directly, or they allow it to make suggestions to the user. For example, information concerning the average degree of dirtiness may be used to make suggestions regarding the frequency with which a zone is cleaned (or to automatically determine a cleaning interval). If a zone regularly exhibits an uneven distribution of dirtiness, the robot can suggest to the user that the zone be further sectored (or it can carry out this further sectoring automatically).

Information concerning the floor type (tiles, wood, carpet, anti-slip, smooth, etc.) can be used to automatically choose a cleaning program that is suited to the floor type or to suggest to the user a cleaning program. In addition to this, the robot's movement (e.g. its maximum speed or minimum curve radius) can be automatically adjusted, for example, to correct excess slippage on a carpet. Zones or areas within zones in which the robot frequently becomes stuck (e.g. lying cables or the like), requiring a user's aid to free it, can also be saved as a characteristic of a given zone. Thus, in future, such zones can be avoided, cleaned with less priority (e.g. at the end of a cleaning operation) or only cleaned when the user is present.

As mentioned above, a designation (bedroom, corridor, etc.) can be assigned to a zone identified as a room. This can either be done by the user or the robot can automatedly select a designation. Based on the designation of a zone, the robot can adapt its behavior. For example, the robot—depending on the designation assigned to the zone—can suggest to the user a cleaning procedure that is adapted to the designation and thus simplify the adjustment of the robot to the user's needs. For example, the designation of a room may be considered in a calendar function, in accordance with which, e.g. for a zone designated as a bedroom a time frame (e.g. 10 pm-8 am) can be specified, during which the robot may not enter the given area. Another example is the designation of a zone as dinette (cf. FIG. 7, zone 320). This designation leads to the assumption of a higher degree of dirtiness (e.g. crumbs on the floor), resulting in this zone being given a higher priority during cleaning. These examples show that the sectoring of the robot's map described above and the (functional) designation of the zones can have a decisive influence on the later behavior of the robot.

In order to accelerate the cleaning of numerous zones, this may be carried out sequentially, wherein transitional movement between the zones should be avoided. This can be achieved by selecting the end point of one cleaning run such that it lies near the starting point of the cleaning run in the next zone. Freely accessible zones can be cleaned very efficiently along a meandering path. The distance of the straight path segments of the meandering path can be adapted to the width of the zone to be cleaned, both in order to achieve a cleaning result that is as even as possible, as well as to end the cleaning operation of the zone at a desired location. For example, a rectangular zone is to be cleaned, starting in the upper left hand corner and ending in the lower right hand corner, along a meandering path whose straight path segments 11 run horizontally (similar to FIG. 10B, wherein the terms right, left, upper, lower, horizontal and vertical refer to the depiction on the map). The extension of the rectangular zone divided by (for an all-encompassing cleaning) the maximum distance a separating the straight path segments 11 results in the minimum number of laps that the robot must make in order to entirely cover the rectangular area. From this the optimum distance between the path segments that is required to reach the desired end point can be determined. This optimum distance, as well as the orientation of the meandering path (horizontal or vertical) can be assigned to a zone and saved for the zone in question.

During a cleaning run of the robot through a zone along a meandering path, the straight path segments 11 can be passed through relatively quickly, whereby the curves 12 (over 180°) are passed through relatively slowly. In order to clean a zone as quickly as possible, it can be of an advantage to pass through as few curves 12 as possible. When cleaning a rectangular zone the meandering path can be oriented such that the straight path segments 11 lie parallel to the longest edge of the rectangular zone. If the zone exhibits a geometric form of greater complexity than a rectangle (in particular if it is a non-convex polygon), the orientation of the meandering path can be decisive as to whether the area can be completely cleaned in one run. In the case of a U formed zone as per the example of FIG. 10, this can be evenly covered by a vertically oriented meander (see FIG. 10A). If a horizontally oriented meander is used, this results in a U area being left uncleaned (see FIG. 10B). It may therefore be advisable, as mentioned above, in addition to the optimum distance between the straight segments of the meandering path, to also assign the orientation of the meander to the zone in question and to save this information.

A further example for when the direction that the robot takes when moving along a planned path is relevant is the cleaning of a carpet. In the case of a deep pile carpet the direction of movement can have an impact on the cleaning results and alternating directions of movement produce a pattern of stripes on the carpet that may not be desired. In order to avoid this pattern of stripes it is possible, for example, to only clean in a preferred direction while moving along a meandering path. While moving back (against the preferred direction) the cleaning can be deactivated by switching off the brushes and the vacuuming unit. The preferred direction can be determined with the aid of sensors or with input from the user, assigned to the zone in question and then saved for this zone.

As explained above, it is often not desirable for the robot to move slowly through a difficult-to-pass zone (and thereby risk collisions with obstacles). Instead of this the robot should move around the difficult-to-pass zone. Therefore, the attribute "zone-to-be-avoided" can be assigned to a zone that is identified as difficult to pass (see the above). The robot will then not enter the zone that is difficult to access except for a planned cleaning. Other areas as well, e.g. such as a valuable carpet, may be designated either by the user or independently by the robot as a "zone-to-be-avoided". As a consequence, when planning the path, the given zone will only be considered for a transition run (without cleaning) from one point to another when no other possibility exists. Furthermore, the numerous obstacles of a difficult-to-access zone present a disturbance while cleaning along a meandering path. In a difficult-to-pass zone, therefore, a specially adapted cleaning strategy may be employed (instead of that of the meandering path). This can be particularly adapted so as to prevent, to the greatest extent possible, any isolated areas from being left uncleaned in the course of the numerous runs around the obstacles. If zones are left uncleaned, the robot can record whether access to the uncleaned zone exists and if so, where it is or whether the zone is completely blocked off by close standing obstacles (e.g. table and chair legs). In this case the user can be informed of zones left uncleaned (because of their inaccessibility).

When employing a robot it may be that not enough time is available to completely clean the area of robot operation. In such a case it may be advantageous for the robot to independently plan the cleaning time according to certain stipulations—e.g. taking into consideration an allowed time—and to carry out the cleaning in accordance with this time planning (scheduling). When scheduling the cleaning, e.g. (1.) the time anticipated for cleaning each of the zones designated for cleaning, (2.) the time needed to move from one zone to the next, (3.) the priority of the zones, (4.) the elapsed amount of time since the last cleaning of a zone and/or (5.) the degree of dirtiness of one or more zones, detected during one or more of the previous exploratory and cleaning runs, can be taken into consideration.

In order to be able to predict the cleaning time needed for a specific zone, the robot may make use of empirical values gathered during previous cleaning runs, as well as theoretical values determined with the aid of simulations. For example, the anticipated cleaning time for small, geometrically simple zones can be determined (e.g. the number of meandering segments multiplied by the length of a segment, divided by the speed plus the turning time required by the robot), in order to generate a prediction for more complex zones (those comprised of the combined simple zones). When determining the anticipated cleaning time for numerous zones, the cleaning time for the individual zones and the time required by the robot to move from one zone to the next will be considered. The automatically generated cleaning schedule can be shown to the human user, who may alter it if needed. Alternatively, the user may ask the robot to suggest numerous cleaning schedules, choose one of these and alter it as deemed necessary. In a further example, the robot may, automatically and without further interaction with the user, begin the cleaning according to an automatically generated cleaning schedule. If a target operating duration is set, the robot can compile a schedule based on the attributes assigned to the zones. The attributes in this case may be, for example: priorities, the anticipated cleaning times for individual zones and/or the expected degree of dirtiness of individual zones. After the target operating time has expired, the robot can interrupt the cleaning, finish the zone it is currently working on or extend the operating time until the user terminates it. The principles mentioned above will be explained in the following using two examples.

Example I (cleaning until termination by the user): In this example, the example apartment of FIGS. 1 to 7 should be cleaned in a quick cleaning program having a target duration of, for example, 15 minutes (e.g. because the user is expecting visitors shortly). In this case, the actual cleaning time need not be precisely set (15 minutes), but may be a few minutes longer or shorter, depending on the actual arrival time of the visitors. The target operating time is a reference value. It is thus desired that the robot continue cleaning until it is stopped by the user, wherein the surfaces that most urgently need cleaning (i.e. the zones with the highest priority) will be cleaned, for example, within the first 90% of the time. For this, the user can inform the robot of the high priority zones while making preliminary adjustments or when selecting the quick cleaning program. These may be, e.g. the entrance way (see FIG. 3, zone 200) and the living room (see FIG. 3, zone 300), as the visitors will only be in these rooms. Both rooms are together too large to be completely cleaned in the given amount of time. It may therefore be advantageous to further sector the zones, in particular the large living room 300, into smaller zones. The carpet (see FIG. 4, zone 303), for example, may have high priority and the dinette (see FIG. 4, zone 320) may have a high degree of dirtiness (detected by the robot or assumed based on empirical data). It may now occur that the robot determines that, in the given amount of time, it will only be able to reliably clean either the corridor (200) and the carpet (303) or the dinette (320). For example, because of the larger expanse of achievable cleaning (i.e. of cleaned surface per unit of time), the robot will begin cleaning the corridor (see FIG. 4, zone 200) and the carpet (see FIG. 4, zone 303) and then proceed to clean the dinette (see FIG. 4, zone 320) until the user terminates the cleaning.

Example 2 (set target time): In a second example the robot is employed, for example, in a department store that is only cleaned during closing hours. The time available for cleaning is thus limited and cannot be exceeded. The area of operation of the robot is in this case so large that it cannot be cleaned in the allotted amount of time. It may therefore be of an advantage to be able to assign priorities to the various zones in the area of robot operation. For example, the zone that encompasses the entrance way should be cleaned daily while other zones that are generally frequented by fewer customers need only be cleaned every third day and, consequently, have a lower priority. On this basis, the robot can carry out a weekly work scheduling. It may also be advantageous, e.g. for the robot to dynamically adapt its schedule to the actual needs. For example, the anticipated degree of dirtiness of a zone can be taken into consideration. This can be determined based on the empirical degree of dirtiness or on the (measurable) number of actual customers entering this zone. The number of customers is, for example, saved in a database, wherein the data is input manually by the department store staff or is determined automatically by means of sensors such as, for example, motion sensors, light barriers or cameras in combination with an image processor. Alternatively, the department store management may spontaneously demand that a zone not previously included in the plan be cleaned if, for example, it is especially heavily soiled due to an accident. The robot can then automatedly include a new zone into the cleaning plan and—in order to meet the set target time—postpone the cleaning of another zone until the following day.

In the following it will be described how a robot map that has been sectored into numerous zones may be used to improve the robot-user communication and interaction. As mentioned above, a sectoring of the area of robot operation would generally be carried out by a human user intuitively. For machines, however, this is, in general, a very difficult task that does not always produce the desired results (the robot lacks human intuition). Therefore, the user should be able to adapt the robot-generated sectoring of the apartment to his/her needs. The possibilities available to the user range here from altering the sectoring by shifting the borders between adjoining zones over the further sectoring of existing zones to the creation of new, user defined zones. These zones may be, for example, so-called "keep-out areas" that the robot is not allowed to enter on its own. The zones (suggested by the robot and, if needed, altered by the user) may thus be furnished by the user with additional attributes that can also influence the behavior of the robot when in operation (in the same manner as the attributes described above that may be automatically assigned to a zone). Possible attributes are, for example, (1.) priority (how important it is for the user that the zone be cleaned), (2.) floor type (which cleaning strategy—dry brushing, wet brushing or only vacuuming, etc.—should be employed?), (3.) accessibility (whether it is even allowed to enter the given zone).

A further possibility is for the user to influence the automatic sectoring process by confirming, for example, or rejecting hypotheses made by the robot. In this case the user may "instruct" the robot to carry out the sectoring of an area of operation. After this the user may influence the sectoring, for example, by designating doors on the map or by eliminating doors incorrectly identified by the robot. Following this the robot, based on the additional information entered by the user, can automatedly carry out a new sectoring of the map. Further, the user can adjust relevant parameters (e.g. typical door widths, thickness of the inner walls, floor plan of the apartment, etc.) so that the robot can use these parameters to generate an adjusted sectoring of its area of operation.

Often, certain parts of the area of robot operation (e.g. of an apartment) will be similar in a given culture, for example the bedroom. If the user furnishes a zone recognized as a room with the designation "bedroom", various criteria—in particular the probability models used to generate hypotheses—can be adapted to those of a typical bedroom during the further automated sectoring of the bedroom. In this manner, an object found in the bedroom having the dimensions of one by two meters may with relative reliability be interpreted to be a bed. In a room designated as a "kitchen", an object of similar dimensions might possibly be determined to be a kitchen island. The designation of a zone is carried out by first selecting the zone on the map of the area of robot operation and by then choosing a designation from a list offered by the robot. It may also be possible for the user to freely choose a designation for the room. To simplify the user's orientation on a map generated by the robot, when designating a zone the user may select the zone and then instruct the robot to enter it. In this manner the user is able to recognize a direct connection between the depicted zone and the actual position of the robot in the apartment, thus enabling the user to assign an appropriate designation to the zone.

Figure 3:
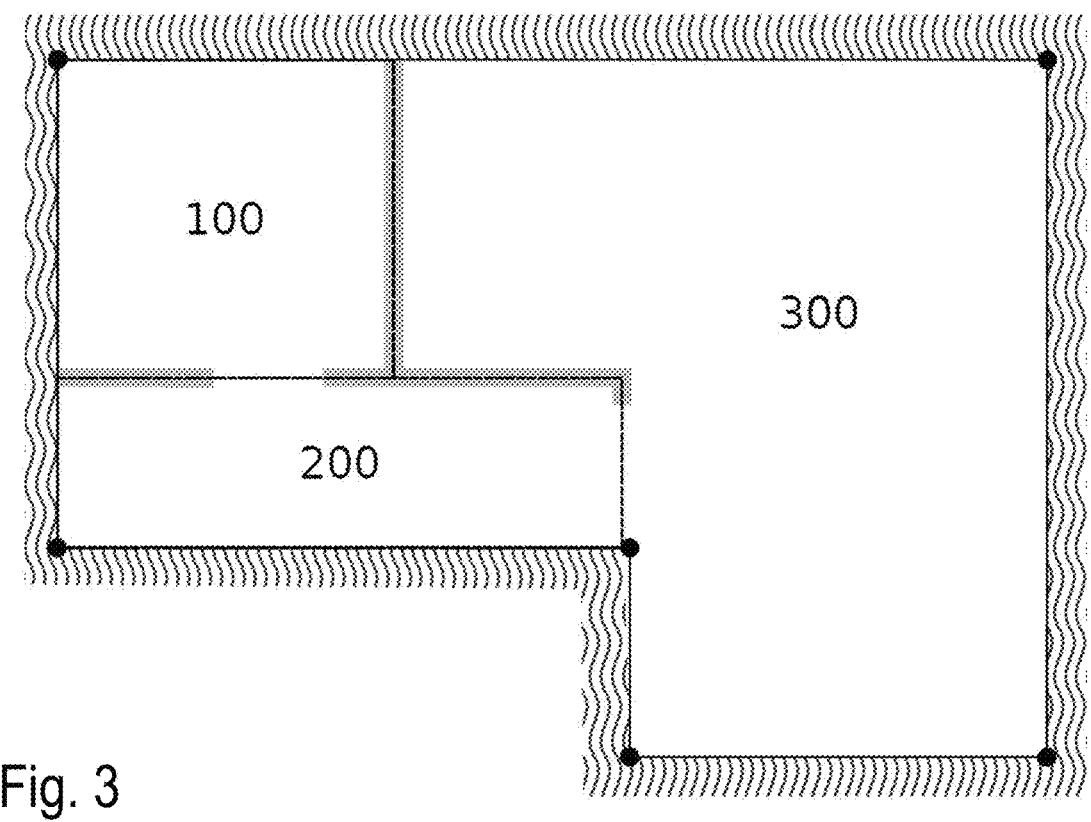
FIG. 3 shows a sectoring of the area of robot operation shown in FIG. 2 into zones (rooms), e.g. based on detected doors and inner walls.

One prerequisite to the designation of a zone on the map of the robot's area of operation by the user is that the robot has already generated a sectoring of its area of operation that is good enough for the user to be able to recognize, for example, the bedroom (e.g. a rough sectoring as shown in FIG. 3). Users who do not want to work with such a preliminary map may, in accordance with an alternative embodiment, inform the robot which room it is currently located in during its first exploratory run (i.e. when the robot is put into operation). In this manner, the designating of the room that the robot is currently located in can be directly used to sector the room into zones. Thus, a high-quality sectored map can be shown to the user from the very beginning. To do this, the user may accompany the robot during its exploratory run. Alternatively, the user can specifically direct the robot to areas of importance, e.g. by remote control, and then designate them. In the process he may make the robot aware of special cases such as the previously mentioned keep-out-areas.

In accordance with a further embodiment, the robot is configured to carry out the sectoring of the map or to improve the characteristics of a detected zone by asking the user direct questions regarding the hypotheses generated during a first exploratory run. This communication between the robot and the user is made possible quite easily, e.g. by means of a software application installed on a mobile device (e.g. tablet computer, telephone, etc.). This can, in particular, take place before a first version of the map is shown to the user to improve the quality of the map displayed by the robot. In this manner, e.g. the robot may ask the user whether a zone that is difficult to access because of a table with chairs is a regularly used dinette. If the question is answered affirmatively, the robot can automatedly deduct conclusions from this answer and assign certain attributes to the zone in question. In the case of a dinette, the robot can assign a higher cleaning priority to the zone as it must be assumed that this area is dirtier than others. The user may confirm, reject or alter the assigned priority.

If the robot is to be employed in a new, unknown area it may direct specific questions to the user in order to gather preliminary information about the area such as, for example, the size of the apartment (the area of robot operation) and the number of rooms. In particular, the user can inform the robot of any deviations from the usual sectoring of a living area or that it will be employed in a commercially used area, such as a floor of offices. This information allows the robot to adapt several parameters that are relevant for the sectoring of its area of operation (such as, e.g. the probability models used to make hypotheses) in order to be able to generate a better sectoring of the map during a following exploratory run and/or to assign the appropriate attributes (e.g. regarding the cleaning strategy) to the recognized zones.

For the interaction between a human user and the robot, information (such as, e.g. a map of the area of robot operation) can be displayed by the robot for the user via a human machine interface (HMI) or user input for controlling the robot can be relayed. An HMI may be implemented on a tablet computer (or a personal computer, a mobile telephone, etc.) by means of a software application. A robot-generated map is generally quite complex and for an inexperienced user difficult to interpret (cf. e.g. FIG. 1). In order to provide a "smooth" interaction between the robot and the user, the information displayed to the user can be filtered and processed. This enables the user to easily understand the displayed information and to subsequently give the robot the desired instructions. In order to avoid confusing the user, small details and obstacles may be omitted from the displayed map. These may include, for example, table and chair legs, but also shoes or other objects left randomly lying about. A user will generally be able to recognize a floor plan of his/her apartment and identify individual rooms on this floor plan. In order to be able to automatedly generate the floor plan based on the measurement data (cf. FIG. 1), the robot first identifies a very rough representation of the apartment in the form of an outline as shown, for example, in FIG. 2. Within this outline the inner walls are then marked which produces a floor plan of the apartment as shown in FIG. 3. The methods, by means of which the robot can automatedly determine such a sectoring of its area of operation, were explained in detail above.

A human user generally has no problem identifying in a floor plan display in accordance with FIG. 3 the bedroom 100, the corridor 200 and the living room 300. To even further simplify the display for the user, the rooms may, for example, be displayed as differently colored surfaces. Obstacles and objects that lie entirely within the area of robot operation are ignored when identifying the apartment outline. This results in an area that is completely bordered off toward the outside, but into which numerous obstacles such as inner walls or furniture standing against the walls protrude. These obstacles are also ignored, i.e. filtered out when displaying the floor plan, thus obtaining a simplified map of the entire area of robot operation.

This simplified map of the area of robot operation may then be automatedly completed by adding elements that are easy for the user to identify such as inner walls, doors and prominent items of furniture, thus obtaining a simple floor plan of the apartment. The sensor data (e.g. the above mentioned boundary lines, see FIG. 1), the sectoring of the area of robot operation into zones that is automatically generated by the robot and user input from previous user interaction may all serve as a basis for this and from this the robot can then generate hypotheses concerning the run of the inner walls and wardrobes standing against them, in the end displaying these on the map. In particular, this simplified display can be obtained by using the methods described above according to FIG. 9 for sectoring the area by means of the successive division into rectangles. If the designation of the rooms is known because, for example, they have been designated by the user, this may also be considered in the simplified display of the map, making it easier for the user to navigate. The corresponding room designation or a sketched representation of objects typical for the room may be displayed. For example, in the bedroom, an object identified as a bed will also be (schematically) displayed as one. In order to set further orientation points for the user, the location of objects known to the robot such as, e.g. the robot base station, may also be marked on the displayed map. When the robot is connected with a WLAN (wireless local area network), it can approximately determine the location of the WLAN base station (access point) or of another device in the wireless network by analyzing the field strength and can then mark this position on the map. If the robot has a camera, it can use image processing methods to identify individual objects such as a table or a wardrobe type and to sketch them into the map. For this purpose, the robot can refer to a database containing sketches of typical items of furniture. Further methods for localizing and identifying objects such as, for example, RFID (radio frequency identification), are well known and will not be discussed here in detail.

Figure 5:
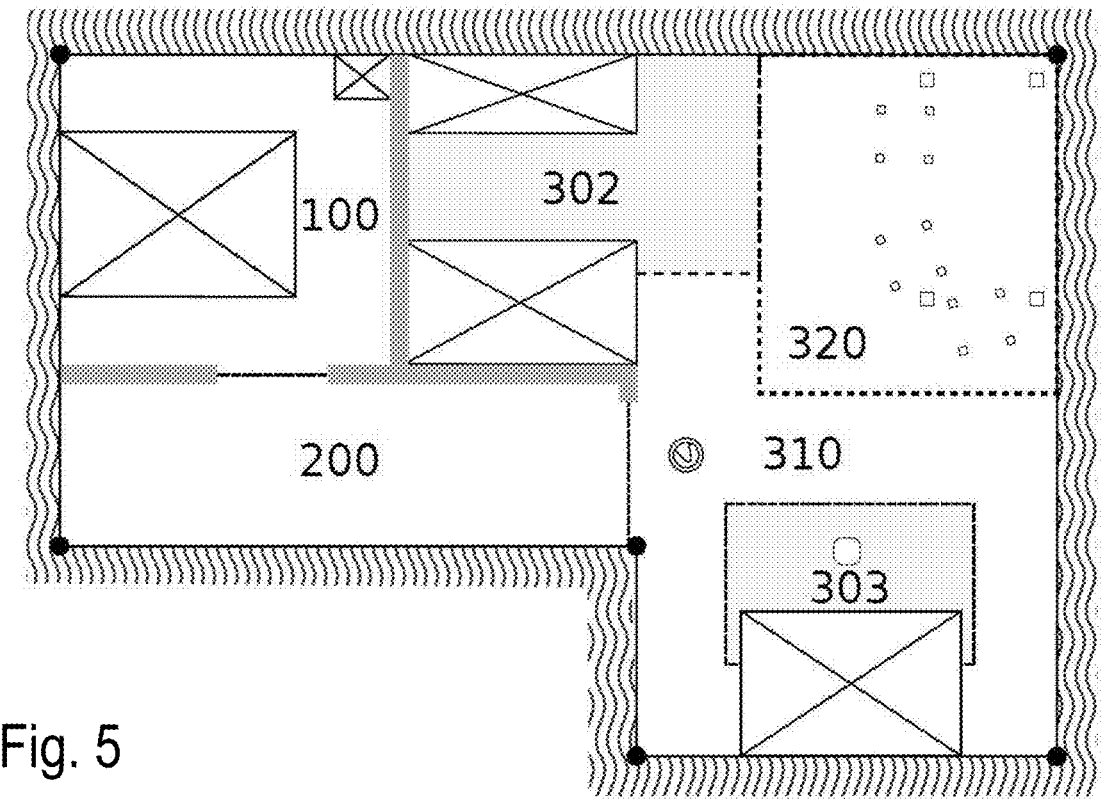
Figure 6:
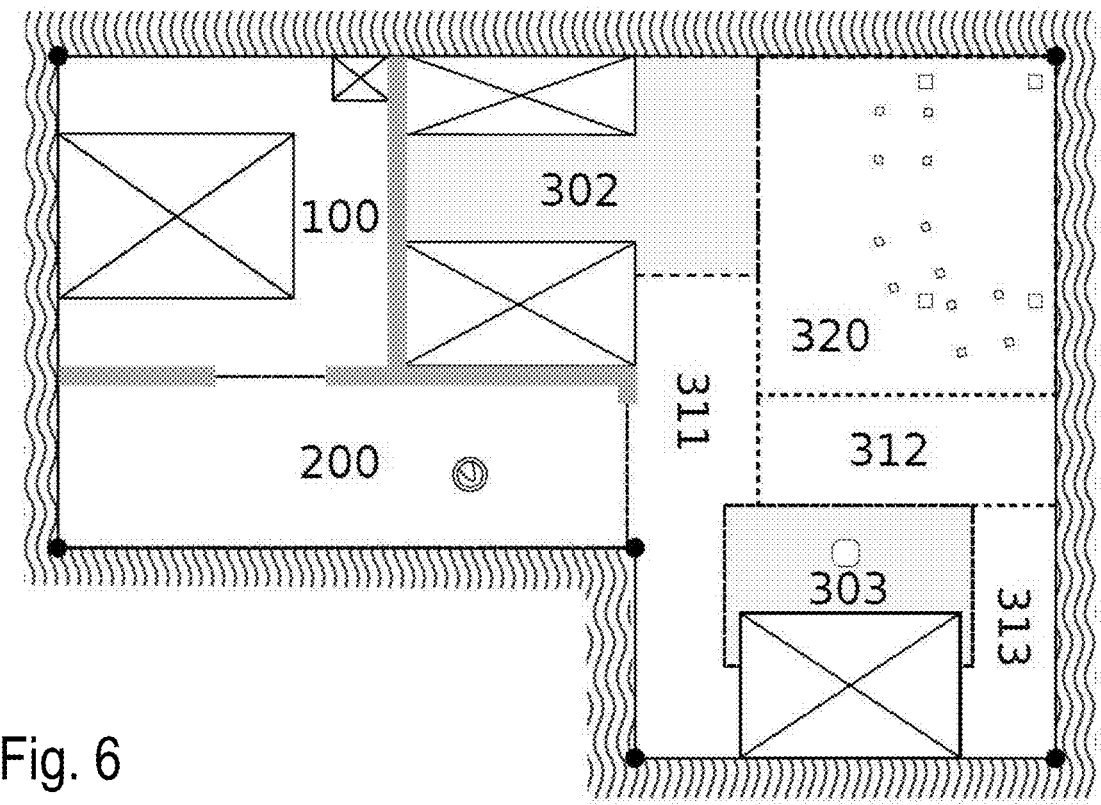
FIG. 6 shows a further refinement of the sectoring shown in FIG. 5.

When in daily use, a user places certain demands on the robot. He may require, for example, the cleaning of the entire apartment, the cleaning of one room of the apartment such as, for example, the living room (FIG. 3 zone 300) or the cleaning of a part of a room such as, for example, a carpet in the living room (FIG. 6, zone 303). When doing so, the user will intuitively regard this small area as a zone of the living room, which itself is a zone of the entire apartment. This—for the human user intuitive—hierarchal visualization of the apartment should be reflected in the sectoring of the area of robot operation and its display on a map. This will be explained in the following with the aid of examples in accordance with the example apartment of FIGS. 1-7.

In order that the user be able to easily navigate the robot generated map, first a greatly simplified floor plan, as shown in FIG. 3, is displayed to the user on an HMI. If needed and requested by the user, additional details can be displayed. For example, the user may select on the simplified floor plan (FIG. 3) the living room 300 by tapping on the map displayed on the HMI or by using a zoom gesture to enlarge the desired area. As a result, the corresponding sector of the map is enlarged and displayed in greater detail. By again tapping on the display (or by other means of input such as, e.g. a mouse click, a keyboard entry or voice command, etc.), the user may select an area and request an action such as, for example, the immediate cleaning of the displayed zone, or the user may choose a planning function or ask to be shown further details.

FIG. 4 shows an example in which the living room 300 is again sectored into zones according to the two different types of floor coverings, here a carpet (number 303) and a tiled floor (number 302). In FIG. 5 the living room is further sectored, identifying the dinette 320 with table and chairs as a difficult-to-access zone. In FIG. 6 the open area 310 was again sectored into smaller zones of more similar dimensions 311, 312, 313. Choice and sequence of the methods used for this sectoring can be combined in endless ways. If the user employs the robot on different floors of a building, this information can also be logically integrated into a hierarchal sectoring of the area of robot operation and correspondingly displayed. For example, a building with different floors can be schematically displayed on the HMI. When the user selects, for example by tapping, a floor, a simplified map that was stored for this floor will be displayed (similar to that of FIG. 3). On this one, as described above, the user may zoom in further and/or give instructions to the robot. For example, with a zoom gesture for zooming out, the building view with the different floors will again be displayed.

The invention claimed is:

1. A method for an automatic sectoring of a map of an area of robot operation of an autonomous mobile robot, the method comprising:
   detecting, by sensors arranged on the autonomous mobile robot, obstacles;
   determining, by the sensors arranged on the autonomous mobile robot, a size and position of the obstacles on the map;
   sectoring, by a processor, of the area of robot operation into numerous rooms or sub-areas according to predetermined rules, and modifying, by the processor, the sectoring, based on the detected obstacles;
   displaying the map, including the rooms or sub-areas on a human machine interface;
   enabling, by the processor, a user interaction with rooms and sub-areas of the map displayed on the human machine interface, wherein the human machine interface receives input of the user regarding the sectoring of the area of robot operation into rooms or sub-areas, position of doors, designation of functions of recognized rooms or sub-areas, or a combination thereof;
   altering, by the processor, the sectoring of the area of robot operation in dependency on the user input;
   generating, by the processor and based on sensor data, hypotheses concerning zone borders or a function of individual detected obstacles, wherein the sectoring of the area of robot operation into numerous rooms or sub-areas is based on the generated hypotheses; and
   wherein a specifiable criterion for the generation of hypotheses comprises a distance between two boundary lines lies within a specified interval, two boundary lines lie on one straight line, function designations of the area of robot operation specified by the user, or a combination thereof.

2. The method of claim 1, wherein the area of robot operation is further sectored, by the processor, into the numerous rooms or sub-areas taking into account the user input.

3. The method of claim 1, wherein the doors between two rooms are detected by the sensors and entered into the map by the processor; and wherein the area of robot operation is sectored, by the processor, into the numerous rooms or sub-areas taking into account the detected doors.

4. The method of claim 1, wherein a rooms or sub-area is sectored, by the processor, into further zones in an automated manner taking into account a preceding user input.

5. The method of claim 1, wherein, depending on the user input, assigning, by the processor, attributes to the rooms or sub-areas that influence modus, time, frequency of processing the respective zone, or a combination thereof.

6. The method of claim 1, wherein the user input concerning the function of a recognized room or sub-area is a designation of at least part of a room and, depending on the designation, the at least part of a room is sectored, by the processor, into further zones.

7. The method of claim 1, wherein a measure or a degree of probability is assigned, by the processor, to each of the hypotheses.

8. The method of claim 1, wherein an attribute is assigned by the processor, to a zone of the zone, wherein the attribute influences processing of the zone by the mobile robot and depends on one or more generated hypotheses.

9. The method of claim 1, wherein images of the area of robot operation are taken by a camera arranged on the robot and, in the images, objects in the area of robot operation are recognized, by the processor, by employing digital image processing.

10. The method of claim 1, wherein a criterion of the specifiable criteria for the generation of the hypotheses concerning zones takes into account objects detected by employing digital image processing.

11. The method of claim 1, wherein the processor is arranged in the robot, on a personal computer or on an internet server.

12. A method for an automatic sectoring of a map of an area of robot operation of an autonomous mobile robot, the method comprising:
   detecting, by sensors arranged on the autonomous mobile robot, obstacles;
   determining, by the sensors arranged on the autonomous mobile robot, a size and position of the obstacles on the map;
   sectoring, by a processor, of the area of robot operation into numerous rooms or sub-areas, based at least on the detected obstacles, wherein the rooms or sub-areas each include at least a part of an area that could be traversed by the robot,
   displaying the map, including the rooms or sub-areas on a human machine interface;
   enabling, by the processor, a user interaction with rooms and sub-areas of the map displayed on the human machine interface, wherein the human machine interface receives input of the user regarding the sectoring of the area of robot operation into rooms or sub-areas, position of doors, designation of functions of recognized rooms or sub-areas, or a combination thereof, wherein the user input offers the possibility of further sectoring the room or sub-areas;
   altering, by the processor, the sectoring of the area of robot operation in dependency on the user input;
   generating, by the processor and based on sensor data, hypotheses concerning zone borders or a function of individual detected obstacles, wherein the sectoring of the area of robot operation into numerous rooms or sub-areas is based on the generated hypotheses; and
   wherein a specifiable criterion for the generation of hypotheses comprises a distance between two boundary lines lies within a specified interval, two boundary lines lie on one straight line, function designations of the area of robot operation specified by the user, or a combination thereof.

13. The method of claim 12, wherein the area of robot operation is further sectored, by the processor, into the numerous rooms or sub-areas taking into account the user input.

14. The method of claim 13, wherein traversable boundaries between areas are displayed, by the processor, on the human machine interface in a different manner than non-traversable boundaries.

15. The method of claim 12, wherein the doors between two rooms are detected, by the sensors, and entered into the map; and wherein the area of robot operation is sectored, by the processor, into the numerous rooms or sub-areas taking into account the detected doors.

16. The method of claim 12, wherein a room or sub-area is automatedly sectored, by the processor, into further zones taking into account a preceding user input.

17. The method of claim 12, wherein, depending on the user input, assigning, by the processor, attributes to the rooms or sub-areas that influence modus, time, frequency of processing the respective zone, or a combination thereof.

18. The method of claim 12, wherein the user input concerning the function of a recognized room or sub-area is a designation of at least part of a room and, depending on the designation, the at least part of a room is sectored, by the processor, into further zones.

19. The method of claim 12, wherein the user input offers the possibility to shift borders.

20. The method of claim 12, wherein the user input offers the possibility to combine sub-areas.

21. The method of claim 12, wherein the user input offers the possibility to enter additional sub-areas.

22. The method of claim 12, wherein the processor is arranged in the robot, on a personal computer or on an internet server.

* * * * *